(12) United States Patent
Segal et al.

(10) Patent No.: US 8,996,790 B1
(45) Date of Patent: *Mar. 31, 2015

(54) SYSTEM AND METHOD FOR FLASH MEMORY MANAGEMENT

(75) Inventors: Avigdor Segal, Netanya (IL); Hanan Weingarten, Herzelia (IL); Alik Vainerovitch, Kiryat Ono (IL)

(73) Assignee: DensBits Technologies Ltd., Haifa (IL)

( * ) Notice: Subject to any disclaimer, the term of this patent is extended or adjusted under 35 U.S.C. 154(b) by 193 days.

This patent is subject to a terminal disclaimer.

(21) Appl. No.: 13/434,083

(22) Filed: Mar. 29, 2012

Related U.S. Application Data

(60) Provisional application No. 61/485,397, filed on May 12, 2011.

(51) Int. Cl.
  *G06F 12/00* (2006.01)
  *G06F 12/02* (2006.01)
(52) U.S. Cl.
  CPC .................. *G06F 12/0246* (2013.01)
  USPC .................. 711/103; 711/E12.008
(58) Field of Classification Search
  CPC ............ G06F 12/0246; G06F 2212/7203
  See application file for complete search history.

(56) References Cited

U.S. PATENT DOCUMENTS

| | | | |
|---|---|---|---|
| 4,430,701 A * | 2/1984 | Christian et al. | 711/119 |
| 4,463,375 A | 7/1984 | Macovski | |
| 4,584,686 A | 4/1986 | Fritze | |
| 4,589,084 A | 5/1986 | Fling et al. | |
| 4,777,589 A * | 10/1988 | Boettner et al. | 710/3 |
| 4,866,716 A | 9/1989 | Weng | |
| 5,003,597 A | 3/1991 | Merkle | |
| 5,077,737 A | 12/1991 | Leger et al. | |
| 5,297,153 A | 3/1994 | Baggen et al. | |
| 5,305,276 A | 4/1994 | Uenoyama | |
| 5,592,641 A | 1/1997 | Doyle et al. | |
| 5,623,620 A | 4/1997 | Alexis et al. | |
| 5,640,529 A | 6/1997 | Hasbun | |
| 5,657,332 A | 8/1997 | Auclair et al. | |
| 5,663,901 A | 9/1997 | Harari et al. | |
| 5,724,538 A * | 3/1998 | Morris et al. | 711/206 |
| 5,729,490 A | 3/1998 | Calligaro et al. | |
| 5,740,395 A | 4/1998 | Hasbun et al. | |
| 5,745,418 A * | 4/1998 | Ma et al. | 365/185.33 |
| 5,778,430 A * | 7/1998 | Ish et al. | 711/133 |
| 5,793,774 A | 8/1998 | Usui et al. | |
| 5,920,578 A | 7/1999 | Zook et al. | |

(Continued)

OTHER PUBLICATIONS

Search Report of PCT Patent Application WO 2009/118720 A3.

(Continued)

*Primary Examiner* — Matthew Bradley
*Assistant Examiner* — Ramon A Mercado
(74) *Attorney, Agent, or Firm* — Dentons US LLP

(57) ABSTRACT

A method, a computer readable medium and a system for managing flash memory. The method may include receiving multiple data sectors from an interface; writing the multiple data sectors into a data buffer that is nonvolatile; creating a pointer in a data management structure that is stored in a metadata buffer that is nonvolatile, for each data sector corresponding to a storage location of the data sector in the data buffer; if a predefined condition is reached, merging data sectors stored in the data buffer with data sectors that are already stored in a sequential nonvolatile portion of the flash memory device, wherein the sequential nonvolatile portion differs from the data buffer.

26 Claims, 13 Drawing Sheets

(56) References Cited

U.S. PATENT DOCUMENTS

| | | |
|---|---|---|
| 5,926,409 A | 7/1999 | Engh et al. |
| 5,933,368 A | 8/1999 | Hu et al. |
| 5,956,268 A | 9/1999 | Lee |
| 5,956,473 A | 9/1999 | Hu et al. |
| 5,968,198 A | 10/1999 | Balachandran |
| 5,982,659 A | 11/1999 | Irrinki et al. |
| 6,011,741 A | 1/2000 | Harari et al. |
| 6,016,275 A | 1/2000 | Han |
| 6,038,634 A | 3/2000 | Ji et al. |
| 6,081,878 A | 6/2000 | Estakhri et al. |
| 6,094,465 A | 7/2000 | Stein et al. |
| 6,119,245 A | 9/2000 | Hiratsuka |
| 6,182,261 B1 | 1/2001 | Haller et al. |
| 6,192,497 B1 | 2/2001 | Yang et al. |
| 6,195,287 B1 | 2/2001 | Hirano |
| 6,199,188 B1 | 3/2001 | Shen et al. |
| 6,209,114 B1 | 3/2001 | Wolf et al. |
| 6,259,627 B1 | 7/2001 | Wong |
| 6,272,052 B1 | 8/2001 | Miyauchi |
| 6,278,633 B1 | 8/2001 | Wong et al. |
| 6,279,133 B1 | 8/2001 | Vafai et al. |
| 6,301,151 B1 | 10/2001 | Engh et al. |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,675,281 B1 | 1/2004 | Oh et al. |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,968,421 B2 | 11/2005 | Conley |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,188,228 B1 | 3/2007 | Chang et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,212,426 B2 | 5/2007 | Park et al |
| 7,290,203 B2 | 10/2007 | Emma et al. |
| 7,292,365 B2 | 11/2007 | Knox |
| 7,301,928 B2 | 11/2007 | Nakabayashi et al. |
| 7,315,916 B2 | 1/2008 | Bennett et al. |
| 7,388,781 B2 | 6/2008 | Litsyn et al. |
| 7,395,404 B2 | 7/2008 | Gorobets et al. |
| 7,441,067 B2 | 10/2008 | Gorobets et al. |
| 7,443,729 B2 | 10/2008 | Li et al. |
| 7,450,425 B2 | 11/2008 | Aritome |
| 7,454,670 B2 | 11/2008 | Kim et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,610,433 B2 | 10/2009 | Randell et al. |
| 7,613,043 B2 | 11/2009 | Cornwell et al. |
| 7,619,922 B2 | 11/2009 | Li et al. |
| 7,697,326 B2 | 4/2010 | Sommer et al. |
| 7,706,182 B2 | 4/2010 | Shalvi et al. |
| 7,716,538 B2 | 5/2010 | Gonzalez et al. |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,911,848 B2 | 3/2011 | Eun et al. |
| 7,961,797 B1 | 6/2011 | Yang et al. |
| 7,975,192 B2 | 7/2011 | Sommer et al. |
| 8,020,073 B2 | 9/2011 | Emma et al. |
| 8,108,590 B2 | 1/2012 | Chow et al. |
| 8,122,328 B2 | 2/2012 | Liu et al. |
| 8,159,881 B2 | 4/2012 | Yang |
| 8,190,961 B1 | 5/2012 | Yang et al. |
| 8,250,324 B2 * | 8/2012 | Haas et al. ............ 711/162 |
| 8,300,823 B2 * | 10/2012 | Bojinov et al. ............ 380/269 |
| 8,305,812 B2 | 11/2012 | Levy et al. |
| 8,327,246 B2 | 12/2012 | Weingarten et al. |
| 8,407,560 B2 | 3/2013 | Ordentlich et al. |
| 8,417,893 B2 | 4/2013 | Khmelnitsky et al. |
| 2001/0034815 A1 | 10/2001 | Dugan et al. |
| 2002/0063774 A1 | 5/2002 | Hillis et al. |
| 2002/0085419 A1 | 7/2002 | Choi et al. |
| 2002/0154769 A1 | 10/2002 | Petersen et al. |
| 2002/0156988 A1 | 10/2002 | Sekibe et al. |
| 2002/0174156 A1 | 11/2002 | Birru et al. |
| 2003/0014582 A1 | 1/2003 | Nakanishi |
| 2003/0065876 A1 | 4/2003 | Lasser |
| 2003/0101404 A1 | 5/2003 | Zhao et al. |
| 2003/0105620 A1 | 6/2003 | Bowen |
| 2003/0177300 A1 * | 9/2003 | Lee et al. ............ 711/103 |
| 2003/0192007 A1 | 10/2003 | Miller et al. |
| 2004/0015771 A1 | 1/2004 | Lasser et al. |
| 2004/0030971 A1 | 2/2004 | Shibata et al. |
| 2004/0059768 A1 | 3/2004 | Denk et al. |
| 2004/0080985 A1 | 4/2004 | Chang et al. |
| 2004/0153722 A1 | 8/2004 | Lee |
| 2004/0153817 A1 | 8/2004 | Chevallier et al. |
| 2004/0181735 A1 | 9/2004 | Xin |
| 2004/0203591 A1 | 10/2004 | Lee |
| 2004/0210706 A1 * | 10/2004 | In et al. ............ 711/103 |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le-Bars et al. |
| 2005/0144213 A1 | 6/2005 | Simkins et al. |
| 2005/0144368 A1 | 6/2005 | Chung et al. |
| 2005/0169057 A1 | 8/2005 | Shibata et al. |
| 2005/0172179 A1 | 8/2005 | Brandenberger et al. |
| 2005/0213393 A1 | 9/2005 | Lasser |
| 2005/0243626 A1 | 11/2005 | Ronen |
| 2006/0059406 A1 | 3/2006 | Micheloni et al. |
| 2006/0059409 A1 | 3/2006 | Lee |
| 2006/0064537 A1 | 3/2006 | Oshima |
| 2006/0101193 A1 | 5/2006 | Murin |
| 2006/0195651 A1 | 8/2006 | Estakhri et al. |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0282411 A1 | 12/2006 | Fagin et al. |
| 2006/0284244 A1 | 12/2006 | Forbes et al. |
| 2006/0294312 A1 | 12/2006 | Walmsley |
| 2007/0025157 A1 | 2/2007 | Wan et al. |
| 2007/0063180 A1 | 3/2007 | Asano et al. |
| 2007/0081388 A1 | 4/2007 | Joo |
| 2007/0098069 A1 | 5/2007 | Gordon |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0140006 A1 | 6/2007 | Chen et al. |
| 2007/0143561 A1 | 6/2007 | Gorobets |

(56) References Cited

U.S. PATENT DOCUMENTS

| | | |
|---|---|---|
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2007/0297226 A1 | 12/2007 | Mokhlesi |
| 2008/0010581 A1 | 1/2008 | Alrod et al. |
| 2008/0028014 A1 | 1/2008 | Hilt et al. |
| 2008/0049497 A1 | 2/2008 | Mo |
| 2008/0055989 A1 | 3/2008 | Lee et al. |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0112238 A1 | 5/2008 | Kim et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1* | 6/2008 | Flynn et al. .................... 713/193 |
| 2008/0148115 A1 | 6/2008 | Sokolov et al. |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0027961 A1 | 1/2009 | Park et al. |
| 2009/0043951 A1 | 2/2009 | Shalvi et al. |
| 2009/0046507 A1 | 2/2009 | Aritome |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn |
| 2009/0132755 A1 | 5/2009 | Radke |
| 2009/0144598 A1 | 6/2009 | Yoon et al. |
| 2009/0144600 A1 | 6/2009 | Perlmutter et al. |
| 2009/0150599 A1* | 6/2009 | Bennett .................... 711/103 |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi et al. |
| 2009/0287930 A1 | 11/2009 | Nagaraja |
| 2009/0300269 A1 | 12/2009 | Radke et al. |
| 2009/0323942 A1 | 12/2009 | Sharon et al. |
| 2010/0005270 A1 | 1/2010 | Jiang |
| 2010/0025811 A1 | 2/2010 | Bronner et al. |
| 2010/0030944 A1 | 2/2010 | Hinz |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0172179 A1 | 7/2010 | Gorobets et al. |
| 2010/0174853 A1 | 7/2010 | Lee et al. |
| 2010/0180073 A1 | 7/2010 | Weingarten et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0241793 A1 | 9/2010 | Sugimoto et al. |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette et al. |
| 2010/0293321 A1 | 11/2010 | Weingarten |
| 2010/0318724 A1 | 12/2010 | Yeh |
| 2011/0051521 A1 | 3/2011 | Levy et al. |
| 2011/0055461 A1 | 3/2011 | Steiner et al. |
| 2011/0093650 A1* | 4/2011 | Kwon et al. .................... 711/103 |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0153919 A1 | 6/2011 | Sabbag |
| 2011/0161775 A1 | 6/2011 | Weingarten |
| 2011/0194353 A1 | 8/2011 | Hwang et al. |
| 2011/0209028 A1 | 8/2011 | Post et al. |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0017136 A1 | 1/2012 | Ordentlich et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |
| 2012/0110250 A1 | 5/2012 | Sabbag et al. |
| 2012/0124273 A1 | 5/2012 | Goss et al. |
| 2012/0246391 A1 | 9/2012 | Meir et al. |

OTHER PUBLICATIONS

Search Report of PCT Patent Application WO 2009/095902 A3.
Search Report of PCT Patent Application WO 2009/078006 A3.
Search Report of PCT Patent Application WO 2009/074979 A3.
Search Report of PCT Patent Application WO 2009/074978 A3.
Search Report of PCT Patent Application WO 2009/072105 A3.
Search Report of PCT Patent Application WO 2009/072104 A3.

(56) References Cited

OTHER PUBLICATIONS

Search Report of PCT Patent Application WO 2009/072103 A3.
Search Report of PCT Patent Application WO 2009/072102 A3.
Search Report of PCT Patent Application WO 2009/072101 A3.
Search Report of PCT Patent Application WO 2009/072100 A3.
Search Report of PCT Patent Application WO 2009/053963 A3.
Search Report of PCT Patent Application WO 2009/053962 A3.
Search Report of PCT Patent Application WO 2009/053961 A3.
Search Report of PCT Patent Application WO 2009/037697 A3.
Yani Chen, Keshab K. Parhi, "Small Area Parallel Chien Search Architectures for Long BCH Codes", Ieee Transactions on Very Large Scale Integration(VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, p. II-369-72 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips.com).
Todd K.Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.
Giovanni Campardo, Rino Micheloni, David Novosel, "VLSI-Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built in Self Diagnosis", ITC International Test Conference, Paper 2.1.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com.
Paulo Cappelletti, Clara Golla, Piero Olivo, Enrico Zanoni, "Flash Memories", Kluwer Academic Publishers, 1999.
JEDEC Standard, "Stress-Test-Driven Qualification of Integrated Circuits", JEDEC Solid State Technology Association. JEDEC Standard No. 47F pp. 1-26.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

\* cited by examiner

FIG. 5A

SYSTEM AND METHOD FOR FLASH MEMORY MANAGEMENT

CROSS-REFERENCE TO RELATED APPLICATIONS

This application claims priority to U.S. Provisional Patent Application Ser. No. 61/485,397, filed May 12, 2011, the disclosure of which is incorporated by reference in its entirety.

FIELD OF THE INVENTION

The embodiments of the invention relate generally to the field of memory storage. More particularly, the disclosed embodiments relate to a system and method of managing flash memory.

BACKGROUND ART

Flash memory devices store information with high density on Flash cells with ever smaller dimensions. In addition, Multi-Level Cells (MLC) store several bits per cell by setting the amount of charge in a cell. Flash devices are organized into (physical) pages. Each page contains a section allocated for data (512 bytes-8 Kbytes and expected larger in the future) and a small amount of spare bytes (64-512 or more bytes for every page) containing redundancy and metadata. The redundancy bytes are used to store error correcting information, for correcting errors which may have occurred during NAND flash lifetime and the page Read process. Each Program operation is performed on an entire page. A number of pages are grouped together to form an Erase unit (erase unit). A page cannot be erased unless the entire erase unit which contains it is erased.

Common applications of Flash devices are Secure Digital (SD) cards or Multi Media (MMC) cards or such embedded devices (eSD and eMMC). An SD card may typically contain Flash devices and a memory controller. The controller translates commands coming in through the SD interface into actions (Read/Write/Erase) on the Flash devices. The most common SD commands may be Read and Write commands of one or more sectors. Where a sector may be, but is not limited to, a sequence of 512 bytes. The Read or Write commands may be of a single sector or multiple sectors. These commands may refer to logical addresses. These addresses may then be redirected to new addresses on the Flash memory which need not directly correspond to the logical addresses that might be referenced by the Read or Write commands. This is due to memory management that may be carried out by the memory controller in order to support several features such as wear-leveling, bad block management, firmware code and data, error-correction, and others. The erase function is performed on an entire erase unit. Because of this functionality, before the data of a certain block may be replaced such as during a write function, the new data must be written in an alternative location before an erase can occur, to preserve the integrity of the stored data.

Due to the small dimensions of a typical SD card and the price limitations, the controller may typically have only a small RAM available for storage. The small size of the RAM memory limits the type of memory management which may be carried out by the controller with regard to the data stored in the flash memory and received from the interface. The controller may typically manage the memory at the erase unit level, because managing data of small particle sizes becomes difficult. That is, the logical memory space may be divided into units of memory contained within a single erase unit or some constant multiple of erase units, such that all logical sector addresses that fall in boundaries of logical addresses of an erase block size will be mapped to the same erase block. This requires that the controller may only hold an erase block allocation map rather than a map that is capable of mapping to the location of individual data sectors or data particles of page size. This may allow the controller to use a smaller amount of the RAM memory for the purpose of managing the links between logical addresses and the location of the data sectors that have been written to the flash memory unit.

This type of management has the drawback that for writing random access data sector to memory or other memory units smaller than an erase unit, erase units must be frequently rewritten. Because of the characteristics of flash memory, each new piece of information is written into an empty page. In flash memory a page may not be rewritten before the entire erase unit is erased first.

If a portion of the memory unit contained within an erase unit is rewritten, it is first written into a freshly allocated, erased erase unit. The remaining, unmodified, contents of the erase unit may then be copied into the new erase unit and the former erase-block may be declared as free and may be further erased. This operation may be referred to as "sealing" or "merging". The operation involves collecting the most recent data of a logical block and then merging it with the rest of the block data in a single erase unit. Thus, even if a single sector from an erase unit is rewritten, a complete erase unit would be rewritten. This may result in causing a significant degradation in the average write speed. It may also impose a significant delay in the response time between random write sector operations. It also may cause undeliverable flash P/E (program/erase) cycling, which may be very significant in new generations of NAND flash where the number of P/E cycles is limited to a few thousand.

SUMMARY OF EMBODIMENTS OF THE INVENTION

According to an embodiment of the invention a method may be provided and may include: receiving multiple data sectors from an interface; writing the multiple data sectors into a data buffer that is nonvolatile; creating a pointer in a data management structure that is stored in a metadata buffer that is nonvolatile, for each data sector corresponding to a storage location of the data sector in the data buffer: if a predefined condition is reached, merging data sectors stored in the data buffer with data sectors that are already stored in a sequential nonvolatile portion of the flash memory device, wherein the sequential nonvolatile portion differs from the data buffer.

The predetermined condition may be reached if a predefined number anew data sectors that should belong to a same erase unit are written.

The method may include merging (a) at least one data sector stored in the data buffer with (b) at least one data sector that is already stored in the sequential nonvolatile portion of the flash memory device and is associated with a same erase unit as the at least one data sector stored in the data buffer.

The merging may include generating a pointer for each erase unit of the sequential nonvolatile portion of the flash memory device.

The method may include writing the multiple data sectors into the data buffer if it is estimated that the multiple data sectors are written to the flash memory device in a random manner; and writing the multiple data sectors into the sequential nonvolatile portion of the flash memory device without writing the multiple data sectors to the data buffer if it is estimated that the multiple data sectors are written to the flash memory device in a sequential manner.

The method may include compressing the data management structure before storing the data management structure in the metadata buffer.

The method may include comprising maintaining at least a portion of the data management structure in a volatile memory module of the flash memory device and retrieving the data management structure from the metadata buffer if a power failure condition occurs.

The method may include searching the data management structure stored in the metadata buffer for a most recent version of the metadata data structure; reading from the metadata data structure pointers associated with recent random\mapping table portions; if one of a plurality of the most recent portions of the random mapping table is found before the most recent version of the metadata data structure then; reading from most recent portion of the random mapping table the pointer to the most recent metadata data structure; if the located metadata data structure is out of date, then; reading the random mapping table; and constructing a metadata data structure with the pointers contained in the random mapping table.

The method may include a creating a pointer for each data sector, wherein the creating of a multiple pointers may include: executing a hash function to provide a hash value; writing a first pointer which points to an address list that comprises a location of the data sector a first portion of a random mapping table; if the first portion of the random mapping table is preceded by another portion, then writing a second pointer to the address list, said second pointer contains the location of the preceding portion of the random mapping table; writing a third pointer to a metadata data structure stored in the data management structure, said pointer contains the location of the first portion of the random mapping table; writing a fourth pointer to the address list, said pointer contains the location of the latest version of the metadata data structure.

Further embodiments of the invention include a computer readable medium that is non-transitory and may store instructions for performing the above-described methods and any steps thereof, including any combinations of same. For example, the computer readable medium may store instructions for receiving multiple data sectors from an interface: writing the multiple data sectors into a data buffer that is nonvolatile; creating a pointer in a data management structure that is stored in a metadata buffer that is nonvolatile, for each data sector corresponding to a storage location of the data sector in the data buffer; if a predetermined condition is reached, merging data sectors stored in the data buffer with data sectors that are already stored in a sequential nonvolatile portion of the flash memory device, wherein the sequential nonvolatile portion differs from the data buffer.

The predetermined condition may be reached if the data management structure exceeds a predefined size limit.

The computer readable medium may store instructions for merging (a) at least one data sector stored in the data buffer with (b) at least one data sector that is already stored in the sequential nonvolatile portion of the flash memory device and is associated with a same erase unit as the at least one data sector stored in the data buffer.

The computer readable medium may store instructions for compressing the data management structure before storing the data management structure in the metadata buffer.

The computer readable medium may store instructions for maintaining at least a portion of the data management structure in a volatile memory module of the flash memory device and retrieving the data management structure from the metadata buffer if a power failure condition occurs.

The computer readable medium may store instructions for: searching the data management structure stored in the metadata buffer for a most recent version of the metadata data structure: reading from the metadata data structure pointers associated with recent random\mapping table portions: if one of a plurality of the most recent portions of the random mapping table is found before the most recent version of the metadata data structure then; reading from most recent portion of the random mapping table the pointer to the most recent metadata data structure; if the located metadata data structure is out of date, then; reading the random mapping table; and constructing a metadata data structure with the pointers contained in the random mapping table.

The computer readable medium may store instructions for creating multiple pointers for each data sector, wherein the creating of the multiple pointers comprises: writing a first pointer to a first portion of a random mapping table of the data management structure, the first pointer points to a location of the data sector: if the first portion of the random mapping table is preceded by another portion of the random mapping table, then writing a second pointer to the first portion of the random mapping table, the second pointer points to a location of the other portion of the random mapping table: writing a third pointer to a metadata data structure stored in the data management structure, the third pointer points to a location of the first portion of the random mapping table; writing a fourth pointer in the first portion of the random mapping table, the fourth pointer points to a location of a latest version of the metadata data structure.

The computer readable medium may store instructions for creating multiple pointers for each data sector, wherein the creating of the multiple pointers comprises: executing a hash function to provide a hash value; writing a first pointer which points to an address list that comprises a location of the data sector a first portion of a random mapping table; if the first portion of the random mapping table is preceded by another portion, then writing a second pointer to the address list, said second pointer contains the location of the preceding portion of the random mapping table; writing a third pointer to a metadata data structure stored in the data management structure, said pointer contains the location of the first portion of the random mapping table; writing a fourth pointer to the address list, said pointer contains the location of the latest version of the metadata data structure.

Additional embodiments of the invention include a system arranged to execute any or all of the methods described above, including any stages—and any combinations of same. For example, the system may include a memory controller that may be arranged to: receive multiple data sectors from an interface; write the multiple data sectors into a data buffer that is nonvolatile; create a pointer in a data management structure that is stored in a metadata buffer that is nonvolatile, for each data sector corresponding to a storage location of the data sector in the data buffer; if a predetermined condition is reached, merge data sectors stored in the data buffer with data sectors that are already stored in a sequential nonvolatile portion of the flash memory device, wherein the sequential nonvolatile portion differs from the data buffer The memory controller may be arranged to merge (a) at least one data sector stored in the data buffer with (b) at least one data sector that is already stored in the sequential non-volatile portion of the flash memory device and is associated with a same erase unit as the at least one data sector stored in the data buffer.

The memory controller may be arranged to write the multiple data sectors into the data buffer if it is estimated that the multiple data sectors are written to the flash memory device in a random manner; and write the multiple data sectors into the sequential nonvolatile portion of the flash memory device without writing the multiple data sectors to the data buffer if it is estimated that the multiple data sectors are written to the flash memory device in a sequential manner.

The memory controller may be arranged to maintain at least a portion of the data management structure in a volatile memory module of the flash memory device and retrieve the data management structure from the metadata buffer if a power failure condition occurs.

The memory controller may be arranged to read, if a power failure condition occurs, most recent pointers from the data management structure stored in the metadata by: searching the data management structure for the most recent version of the metadata data structure; reading from the metadata data structure pointers associated with the most recent random mapping table portions: if one of a plurality of the most recent portions of the random mapping table is found before the most recent version of the metadata data structure then; reading from most recent portion of the random mapping table the pointer to the most recent metadata data structure; if the located metadata data structure is out of date, then; reading the random mapping table; and constructing a metadata data structure with the pointers contained in the random mapping table.

The memory controller may be arranged to: write a first pointer to a first portion of a random mapping table stored in the data management structure, said pointer contains the location of the data sector; if the first portion of the random mapping table is preceded by another random mapping table portion, then writing a second pointer to the first portion of the random mapping table, said second pointer contains the location of the preceding portion of the random mapping table; write a third pointer to a metadata data structure stored in the data management structure, said pointer contains the location of the first portion of the random mapping table; write a fourth pointer in the first portion of the random mapping table, said pointer contains the location of the latest version of the metadata data structure.

The memory controller may be arranged to: execute a hash function to provide a hash value; write a first pointer which contains the location of the sector of data to an address list corresponding to the hash value in a first portion of a random mapping table; if the first portion of the random mapping table is preceded by another portion, then write a second pointer to the address list, said second pointer contains the location of the preceding portion of the random mapping table; write a third pointer to a metadata data structure stored in the data management structure, said pointer contains the location of the first portion of the random mapping table; write a fourth pointer to the address list, said pointer contains the location of the latest version of the metadata data structure.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
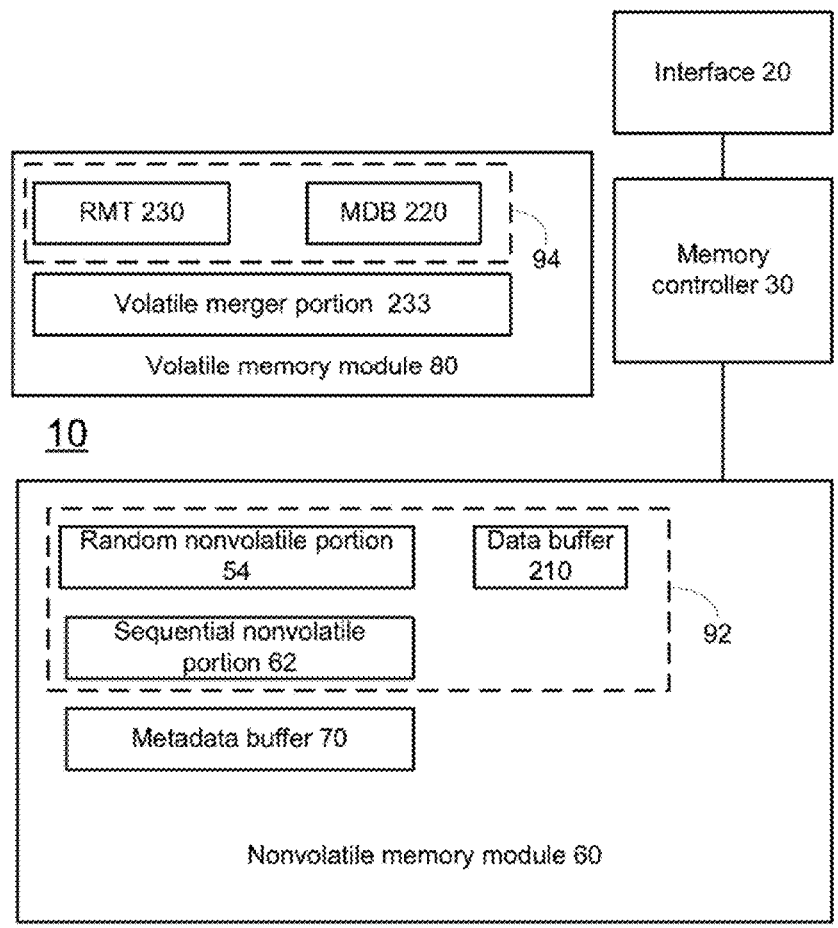
FIGS. 1A and 1B schematically illustrate a system according to various embodiment of the invention.

It will be appreciated that for simplicity and clarity of illustration elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Embodiments of the invention may provide for a method and system for managing flash memory. Embodiments of the invention may interact with an interface and may receive an input of a one or a plurality of data sectors or one or more portion of a data sector. The data sectors may then be stored in a metadata buffer contained in nonvolatile memory. For each data sector received from the interface a pointer may be created containing the location information of the data sector. The pointer may be written to a data management structure. Once a predetermined condition is reached the data sectors may be merged into the nonvolatile flash memory. The metadata buffer may differ from a stack or a Last In First Out buffer. It may be arranged in a log-like manner, where writings are done to the head of the metadata buffer, and discard is done all over the length of the list stored in the metadata buffer.

Some embodiments of the invention may provide for a memory controller that may be contained within the flash memory unit. A flash memory unit may include any or all of a volatile memory module, a nonvolatile memory module, an interface module and may include additional modules. In other embodiments of the invention the memory controller may be contained in a control unit, separate from the flash memory unit. In one embodiment of the invention the memory controller may be contained on a logical device, such as a computer.

In some embodiments of the invention, the interaction with an interface may be an interaction with an interface of a logic device, such as a computer. Such logical device may be capable of sending and receiving sectors of data and may further be capable of sending and receiving data that contains information including commands corresponding to actions performed on the data by the memory controller and address information for the data sectors assigned by the logic device. Logic may refer to hardware, software, other logic, or any suitable combination of the preceding. Certain logic may manage the operation of a device, and may comprise, for example, a processor.

An interface may refer to logic of a device operable to receive input for the device, send output from the device, perform suitable processing of the input or output or both, or any combination of the preceding, and may comprise one or more ports, conversion software, or both A data sector may refer to a packet of data which may be limited to a single data size, may vary in sizes or both in different embodiments of the invention. A data sector is a packet of data that may be smaller in size than the size of a single erase unit of the corresponding flash memory unit. The term erase unit may be an erase block or multiple erase blocks that are pointed by a single pointer in the data management structure.

In some embodiments of the invention, the input of a stream of data sectors may occur in response to an action or command executed by the flash controller. In one embodiment of the invention, the input consisting of a stream of data sectors may occur when the data sectors are present on the interface.

In some embodiments of the invention the metadata buffer contained in the volatile memory may be an allocated portion of the flash memory containing the primary nonvolatile data storage of the flash memory unit. In one embodiment of the invention the metadata buffer may be contained in a memory module in the nonvolatile memory separate from the flash memory module containing the primary nonvolatile data storage of the flash memory unit.

Embodiments of the invention may refer to a pointer as a logic data type whose value refers directly or otherwise, using its address, to another value or segment of data stored elsewhere in a memory of a logic device. Such logic devices include, but are not limited to a flash memory unit.

In some embodiments of the invention, a pointer may be used in data structures to implement and control the data structures. In embodiments of the invention the data structures include one or more of lists, queues and trees. In one embodiment of the invention the pointers may be absolute such that the actual physical or virtual address is used in the pointer. In another embodiment of the invention the pointers may be relative, such that the pointer addresses represent a set offset from an absolute start or nominal address. In embodiments of the invention, pointers are not limited to a specific data size or format.

Some embodiments of the invention may enable sequential writing of data to a sequential memory portion of the flash memory unit, while random writings of data are serviced by a random access portion of the flash memory unit. In one embodiment of the invention, the sequential memory portion may be contained in a sequential module of the nonvolatile memory and the random access portion is contained within the random access memory module of the nonvolatile memory. In another embodiment of the invention, both the sequential and random portions are contained in a common module in the nonvolatile memory of the flash memory unit.

Embodiments of the invention may provide for a data management structure arrangement that may include a data management structure stored in the volatile memory portion of the flash memory unit and may also include a data management structure stored in a nonvolatile memory module of the flash memory unit. In one embodiment of the invention, the data management structure stored in the volatile memory may be written to every time a pointer is created or edited, while the data management structure stored in nonvolatile memory may be updated periodically by writing the latest pointer data, since the last update, in the volatile data management structure. This approach may reduce the amount of unnecessary writes to the flash memory. In another embodiment of the invention, the data management structure contained in both the volatile and nonvolatile memories is written to every time a pointer is created or edited.

In embodiments of the invention the data management structure may be implemented in one or more forms of storing data. These may include an array, a link list, a hash table, a heap, a tree, a stack or a queue. In some embodiments of the invention, the data management structure may store information including data, metadata, pointers or other data types which can be implemented to store address and location information.

Embodiments of the invention may contain a data management structure which may include a random mapping table (RMT) and a metadata data structure (MDB). Both the RMT and the MDB are not limited to a single type of data structure and may be implemented through one or more of an array, a link list, a hash table, a heap, a tree, a stack or a queue. The RMT is not necessarily implemented in random access memory and the term random does not refer to a memory type. The MDB may include pointers to the most recent RMT portions. In one embodiment of the invention, the most recent RMT portion may refer to the most recently written version of a portion of the RMT contained in the data management structure out of a plurality of associated versions of portion of the RMT. Where each associated version of an RMT portion may represents a previous or next modification of other versions of RMT portion. Each RMT portion may include a pointer to the latest version of the MDB and may include a pointer to the preceding portion of the RMT.

In some embodiments of the invention, the latest version of the MDB may refer to the most recently updated version of the MDB structure containing the most recent pointers. In one embodiment of the invention the MDB version is considered most recent if it contains all of the pointers written to the MDB up to that point in time. In another embodiment of the invention the MDB version is considered the most recent when the MDB contains all of the pointers written to the MDB up to an update period, where the update period may be a period of time or a plurality of write actions writing pointers to the MDB, for duration of which the MDB version is considered the most recent. In embodiments of the invention, an MDB version may refer to the most recent version of a plurality of MDB data structures contained in the data management structure. A version may refer to a change to the contents of the pointers and other data contained in the structure with the passage of time.

According to some embodiments of the invention, the RMT and the MDB may be stored in the volatile memory and may additionally be stored in the nonvolatile memory of the flash memory unit. In some embodiments of the invention the RMT and MDB stored in the nonvolatile memory may be stored in the metadata buffer module contained in the nonvolatile memory of the flash memory unit.

In one embodiment of the invention, the pointers may be written to the RMT and MDB contained the volatile memory. Then as a response to an update condition the data in the RMT and MDB of the volatile memory may be written to the RMT and MDB in the nonvolatile memory. This full process may be referred to as writing pointers to the RMT and MDB. An update condition may be met once pointers are added to the RMT and MDB corresponding to a new sector or multiple new sectors. The RMT and MDB in the nonvolatile memory may then be updated to correspond to the contained in the volatile memory RMT and MDB.

According to one embodiment of the invention, the RMT and MDB may be stored in a compressed format in the nonvolatile memory of the flash memory unit. Compression may refer to a process of encoding the data that is to be compressed to take up less storage space and less bandwidth in transmission. The effectiveness of the compression may depend on the method used and the type of data. Various compression methods may be used to accomplish the compression. In one embodiment of the invention the compressed RMT and MDB may need to be decompressed before they may be read, written or another similar action performed on the data. Decompression may refer to a process of reversing the encoding of data to return it to its full dimension.

According to one embodiment of the invention, the RMT and MDB may be stored in a pre-allocated portion of the random access memory which may be part of the flash memory unit. According to another embodiment of the invention, the RMT and MDB may be stored in a metadata buffer, which may be contained in the random access memory.

In some embodiments of the invention, the RMT, MDB and the pointers stored in a nonvolatile memory may be used in recovering from a power failure condition. A power failure condition may refer to any condition where the power supplied to the flash memory unit might have changed for any period of time outside of set or actual operational levels or any other condition which may affect the integrity of the data contained in the volatile memory module of the flash memory unit. Integrity of the data may be affected if some or all of the data contained in the volatile memory before the power failure condition is missing, altered or in a condition where it cannot be read by the file controller after the power failure condition.

According to some embodiments a search may be done for the most recent RMT portion or for the most recent MDB version that may be contained in the data management structure. The method that may be used to perform the search is not limited to any single type of search or process and any suitable search process may be used.

If the most recent MDB version is found first as a result of the search process, then all RMT portions may be retrieved based on the pointers contained within the MDB.

This may be accomplished by reading the most recent MDB portion. The MDB may contain pointers to all the latest RMT portions at the time of the MDB write. By reading the pointers contained in the most recent MDB version it may be possible, by utilizing the address information contained in the pointers, to locate all or most of the most recent RMT portions. The most recent RMT portions may refer to RMT portions which did not have more recent versions at the time the most recent MDB version was written.

If the search function locates a most recent RMT portion before it locates the most recent MDB version in the data management structure, then the pointer to the MDB and to other RMT portions may allow the MDB to be restored. In one embodiment of the invention, the most recent RMT portion that was located by the search process may be read to access a pointer contained within the RMT portion that contains the address information of the most recent version of the MDB. The most recent version of the MDB may then be located and read. The MDB may contain pointers to all the latest RMT portions at the point of the MDB write. By reading the pointers contained in the most recent MDB version it may be possible by utilizing the address information contained in the pointers to locate all of the most recent RMT portions. The most recent RMT portions may refer to RMT portion which were written to at the same time as the most recent MDB version.

According to one embodiment of the invention, once the most recent RMT portions and the most recent MDB version are restored, they may then be written into the data management structure contained in the volatile memory of the flash memory unit. This may restore the data management structure in the volatile memory to the same contents which it had before the power failure condition or to a previous version of the contents of the MDB and RMT that were contained in the volatile data management structure at the time of the power failure condition.

Some embodiments of the invention may arrange pointers in address lists according to sequential logic addressing. In one embodiment of the invention the address list may be implemented using an address list data structure. One or more address lists may be contained in the RMT. In one embodiment of the invention the RMT structure may contain a predefined plurality of address lists. According to one embodiment of the invention the address list may contain pointers to data sectors or other portions of data that may be stored in the nonvolatile memory module. These may include the random data portion the primary nonvolatile data portion storage.

In one embodiment of the invention, a hash function may be applied on the logical address of the data sectors in order to provide a hash value. The hash value may be used to select the address list for the pointers to the corresponding data sectors. A hash function may refer to any defined procedure or mathematical function which may convert a large, possibly variable-sized amount of data into a small datum. Such datum may be in the form of a single number, but is not limited to numbers, and may serve as an index to an array or list.

For example, if associativity of the hash is eight address lists, then the hash function may have eight possible address values. In one embodiment of the invention, the hash function may be selected such that the hash values are evenly distributed over the entire disk space. In some embodiments of the invention, the address list of pointers may include pointers pointing to data sectors in a random portion of the nonvolatile memory of the flash memory unit.

According to an embodiment of the invention each address list may be sorted according to the logical address of the elements in the address list. Logical address may refer to an address at which a data item may appear to reside from the perspective of an executing function. A logical address may be different than a physical address due to an operation performed by a method including an address translator, mapping function or an address offset.

According to another embodiment of the invention, there may be a time gap between the event of adding a new member to the address list and the event of soiling the address list. This time gap may allow to more easily determine what was the last pointer added to the address list.

According to some embodiments of the invention a method may be provided. The method may include (i) receiving a plurality of data sectors, wherein each received data sector may be associated with an erase unit out of a plurality of erase units; (ii) generating metadata structures that include a RMT and a MDB to represent the locations of the sectors in a random portion of a flash memory unit; and (iii) merging, upon completion of a merge criterion, received sectors that may belong to same erase unit and other sectors of the erase unit to provide a new erase unit.

According to one embodiment of the invention, the plurality of data sectors may be received or become available at the interface from a logical device. Such logical device may be a computer. An erase block may refer to a set size portion of memory corresponding to the smallest block of data that may be erased by the flash controller or as a response to an erase request by the flash controller, without affecting the data contained in any other portion of the memory. In one embodiment of the invention the plurality of erase blocks may refer to some or the entire erase blocks which may be stored in the primary nonvolatile data storage, the metadata buffer or both. It is noted that each one of an erase block and an erase unit can be logical entities or physical entities.

According to embodiments of the invention, generating the data management structures that include a RMT and a MDB may be accomplished by allocating space in the data management structure and writing to corresponding sections allocated for the RMT and the MDB according to a set procedure which may include writing pointers and metadata. In one embodiment of the invention the writing process may include the same process of writing pointers to the RMT and MDB that is used when a data sector is received at the interface and is disclosed in this specification. Although the interface may also be arranged to receive a portions of a data sector, for simplicity of explanation it is assumed that it receives one or more data sectors. Once portions of a date sectors are received the flash memory controller may reconstruct the data sector.

According to embodiments of the invention, data sectors may be merged. Merging may refer to a process that may include collecting the most recent data of a logical block, which may be merged with other data contained in a single erase unit. The block of data may then be written to a new erase unit and the former erase unit may be declared as free and may be further erased.

Some embodiments of the invention may merge data sectors that may be mapped to the same flash memory block. According to an embodiment of the invention, the predetermined condition may be reached when one or more of the address lists exceed a predefined size limitation, which may cause a merge of the data sectors to occur.

Merging may refer to a process that may include collecting the most recent data of a logical block, which may be merged with other data contained in a single erase unit. The block of data may then be written to a new erase unit and the former erase unit may be declared as free and may be further erased.

According to some embodiment of the invention, each new sector to be written to the flash memory unit may be assessed regarding its write target. The write target may refer to a choice of one of a plurality of memory modules contained in the nonvolatile memory of the flash memory unit.

According to some embodiment of the invention, flash memory management may estimate the probability that the incoming transaction is random and decide to write the incoming data to the random portion of the nonvolatile memory of the flash memory unit.

In some embodiments of the inventions, the incoming probability may be set if the flash memory management may have estimated that it is probable that the incoming data is associated with random writing operations. In some embodiments of the invention the probability is preset to a specific percentage or other definite threshold to determine a condition that will result in a determination of probable by flash management. In another embodiment a non-rigid probability threshold may be used including feedback adjustable methods and may include other forms of non-rigid thresholds that may adjust to a plurality of conditions or inputs.

According to some embodiments of the invention, if the data write operation was previously set to write data sectors to random memory and after multiple write cycles, it may be determined that the writing is sequential then the next sector may be written to the sequential portion of the nonvolatile memory. The sequential data which may have been written to the random memory of the memory before it was detected that the data required sequential writing, may also be written to the sequential portion of the nonvolatile memory. These sectors may be discarded from the random access portion of the nonvolatile memory either after being written to the sequential portion of after an additional operation.

In one embodiment of the invention the random memory portion and the sequential memory portion may be logical parts of the nonvolatile memory of the flash memory unit.

A write cycle may refer to writing one or more data sectors to memory. In one embodiment of the invention, a write cycle may refer to writing one or more data sectors to the nonvolatile memory which may include writing to one or both of the primary nonvolatile data storage and the metadata buffer. The write process may be performed using the process disclosed previously in this specification, including creating pointers in the data management structure.

According to embodiments of the invention, detecting whether the data is sequential or random may be accomplished through various processes. In one embodiment of the invention the data sectors or their corresponding metadata may be analyzed at periodic intervals to determine the associated memory module destination. In some embodiments of the invention the detection may be based on metadata received from the logic device.

According to some embodiments of the invention the number of superseded sectors per erase unit of the random portion may be tracked. Tracking may refer to the act of recording data into a list or other data structure in a manner that may allow it be read and analyzed. In one embodiment of the invention the data collected during tracking may be used to provide an indication of when an erase unit may be erased. In some embodiments of the invention, a sector may be considered superseded if a newer version of that sector, one that may have the same logical address has been written to the flash memory. A logical address may refer to address information that is assigned by a logic device to a data sector and all of its versions through time that may have been written to the flash memory unit.

FIG. 1A schematically illustrates a system 10 according to embodiments of the invention. System 10 includes an interface 20 that may be linked to a memory controller 30 and may be also linked to a nonvolatile memory module 60 and a volatile memory module 80.

The nonvolatile memory module 60 may contain a nonvolatile random portion (also referred to as random portion) 54, a nonvolatile sequential portion (also referred to as sequential portion) 62, a data buffer 210 and a metadata buffer 70.

Figure 1B:
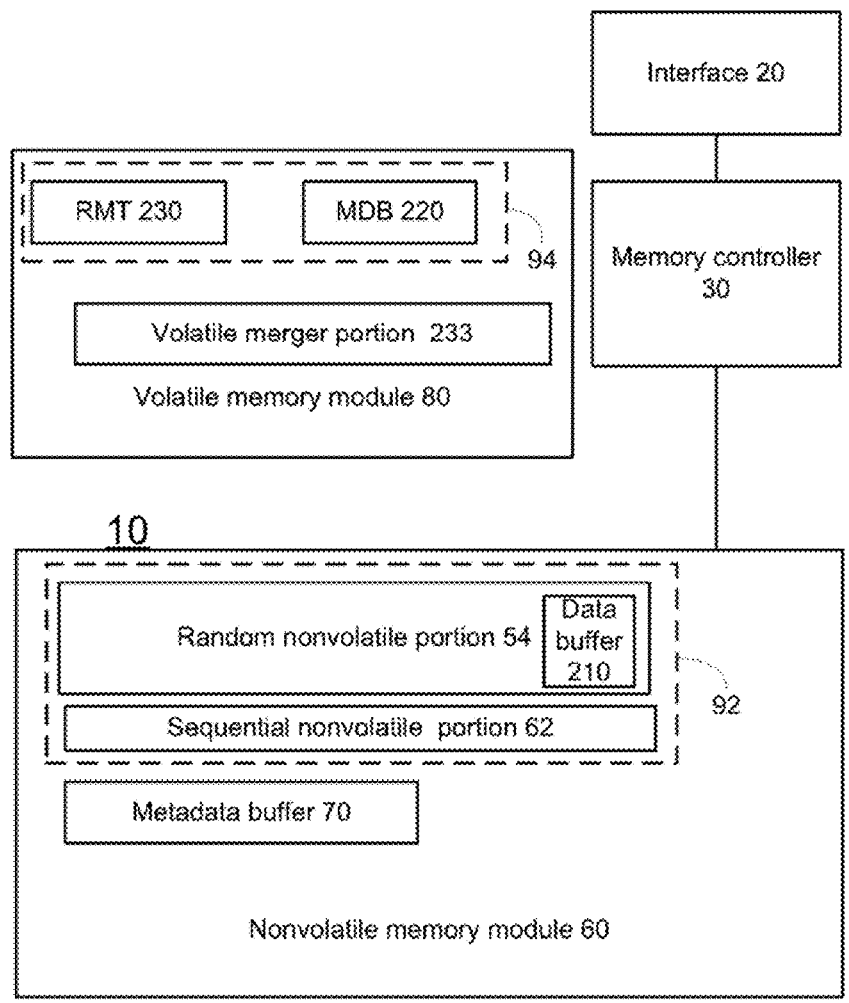

A random portion may refer to a logically allocated random portion memory, while a sequential portion may refer to a logically allocated sequential portion memory. Metadata buffer and other management portions may be allocated within the nonvolatile memory. In FIG. 1A some data structures such as the metadata buffer 70 may be illustrated as being contained outside the random portion 54 or sequential portion 62, although these structures may be contained within nonvolatile memory. In FIG. 1B the data buffer 210 is illustrated as being included in the random portion 54.

FIG. 1A also illustrates a volatile merger portion 233 that can be used when data sectors are merged. If, for example, one or more data sectors of the data buffer 210 should be merged with one or more data sectors stored in the sequential portion 62, then all of these data sectors can be written to the volatile merger portion 233 before being written to the sequential portion 54.

In one embodiment of the invention the random portion 54 and the sequential portion 62 may be referred to as the primary nonvolatile data storage 92, when the random portion 54 and the sequential portion 62 do no contain the metadata buffer 70. According to another embodiment of the invention the primary nonvolatile data storage may refer to the random portion 54 and the sequential portion 62 excluding any memory area occupied by the metadata buffer 70 if the metadata buffer is contained within one or both of the random portion 54 and the sequential portion 62. In another embodiment of the invention the primary nonvolatile data storage may refer to the random portion 54 excluding any memory area that may be occupied by the metadata buffer 70, if the all or part of the metadata buffer 70 is contained within the random portion 54.

The metadata buffer 70 may store portions of the RMT and MDB. The RMT and MDB may be stored in multiple other ways, including in the volatile memory 80. The metadata buffer 70 may also store incoming data sectors received from the interface 20. The memory controller may write to the metadata buffer 70 both the incoming data sectors from the interface 20 and corresponding pointers to the RMT and MDB. There can be provided a single copy of the MDB while there may be many copies of the RMT.

The RMT 84 and the MDB 90 may be stored additionally in the volatile memory module 80. In one embodiment of the invention the most recent version or a plurality of the most recent versions of the RMT and MDB stored in the metadata buffer 70 may be stored in the volatile memory module 80. The RMT 84 and MDB 90 may also be stored in the nonvolatile memory module 60. In one embodiment of the invention the RMT 84 and MDB 90 may be stored in the nonvolatile memory module 60 in a compressed format.

A data management structure 94 may include the RMT 230 and the MDB 220. It is noted that the data management structure 94 can be stored in the nonvolatile memory module 60.

Data sectors that may belong to the same erase unit may be written in the random portion 54 until being merged. The merged block may be written to the sequential portion 6'.

Figure 2A:
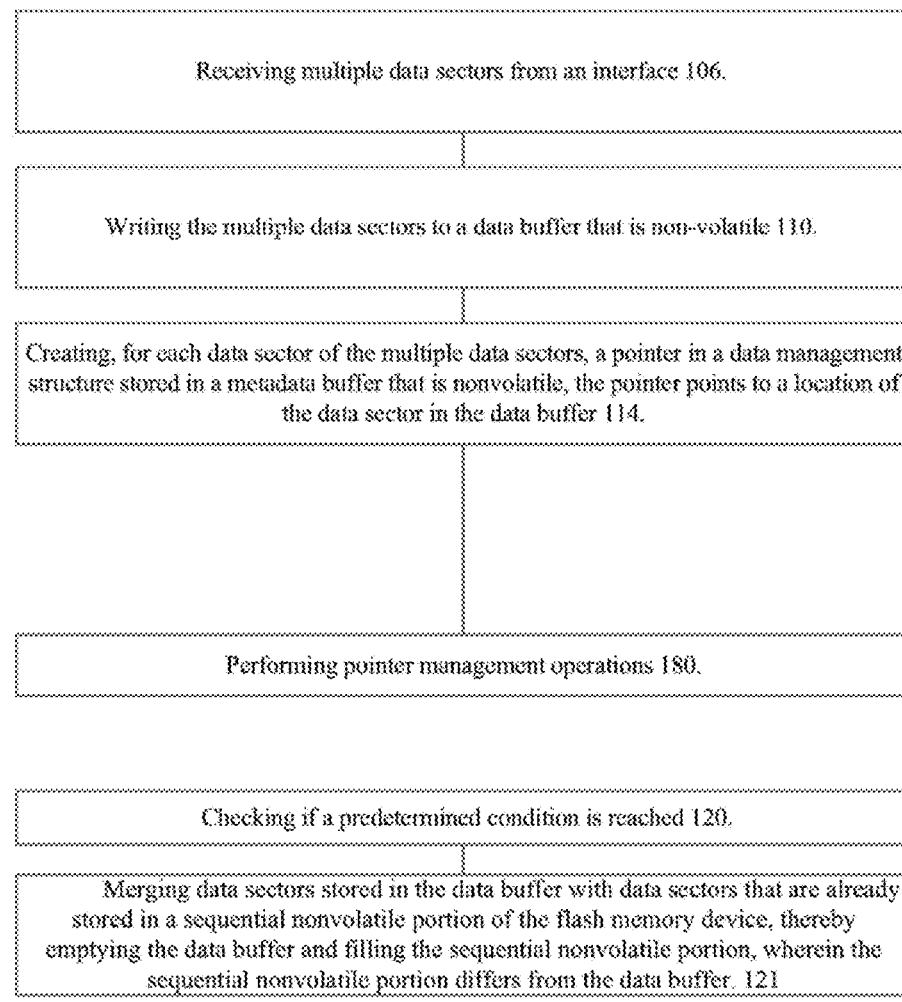
FIG. 2A is a schematic flow chart diagram of a method according to an embodiment of the invention.
Figure 2B:
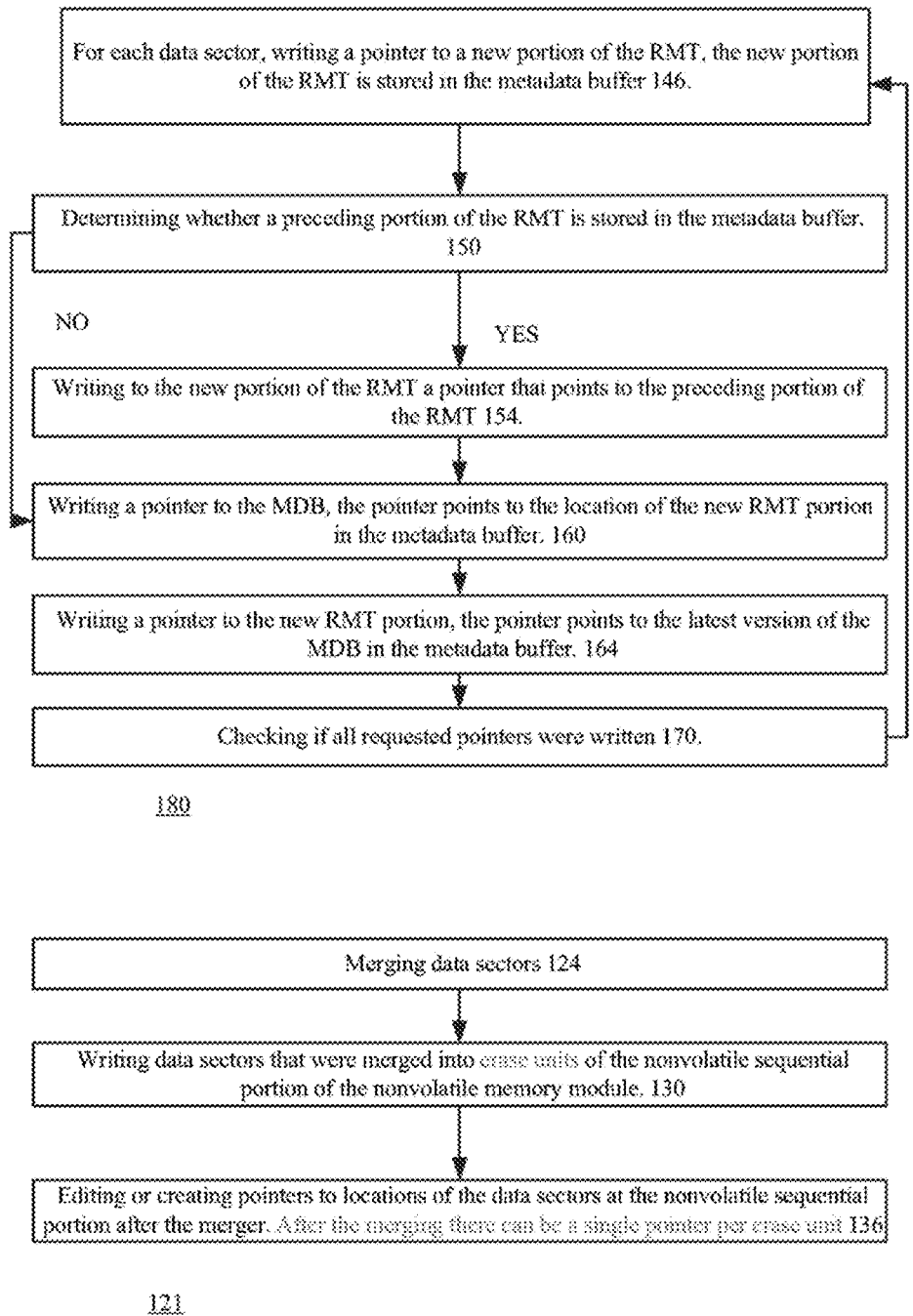
FIG. 2B is a schematic flow chart diagram of a various stages of the method of FIG. 2A according to an embodiment of the invention.

FIG. 2A is a schematic flow chart diagram of a method 100 in accordance with an embodiment of the invention. FIG. 2B shows some of the stages of method 100 in greater details according to embodiment of the invention.

A memory controller may receive data sectors from an interface (106). The data sectors may then be written into a nonvolatile data buffer (110). In some embodiments of the invention the write action (110) may be automatic in response to data sectors being received at the interface (106). In one embodiment of the invention the method may wait until a preset plurality of data sectors are received at the interface 106 or some further action triggers the write action (110). According to some embodiments of the invention, the nonvolatile data buffer (110) may reference a memory section which may be a part of the nonvolatile memory module of the flash memory unit.

For each data sector that may be written into the nonvolatile buffer (110) the method may create a pointer in a data management structure that is stored in a metadata buffer that is nonvolatile (114). According to some embodiments of the invention, the data management structure may contain a RMT structure and a MDB structure. In some embodiments of the invention, the data management structure may be contained in both the volatile memory and the nonvolatile memory of the flash memory unit. At least a portion of the data management structure may be temporarily stored in a volatile memory module.

According to some embodiments of the invention, creating pointers in a data management structure (114) may include creating pointers in a first data management structure contained in the volatile memory and a second data management structure contained in the nonvolatile memory of the flash memory unit. In one embodiment of the invention the second data management structure may be contained in a metadata buffer within the nonvolatile memory.

According to one embodiment of the invention, creating pointers (114) may be accomplished by creating pointers in the first data management structure contained in the volatile memory and the second data management structure contained in the nonvolatile memory for each write operation of a data sector into the metadata buffer (110). In another embodiment of the invention, creating pointers (114) may be accomplished by creating pointers in the first data management structure contained in the volatile memory for each write operation of a data sector into the metadata buffer (110) and periodically or in response to another condition, updating the second data management structure contained in the nonvolatile memory so that the second data management structure contains all of the points created in the first data management structure since the last update operation.

The creating of a pointer (114) may be followed performing pointer management operations (180).

FIG. 2B illustrates stage 180 as including stage 146, 150, 154, 160, 164 and 170. It is noted that other stages can be applied, especially of the pointers are arranged in non-linked lists (for example—in sorted lists).

The performing of the pointer management operation can include creating writing for each data sector a pointer to a new portion of the RMT, the new portion of the RMT is stored in (at least) the metadata buffer (146).

The pointer (of 146) may contain the location information of the data element. A data element may reference any sized particle of data which may be found whole in a single location. According to one embodiment of the invention, a data element may include a data sector and a plurality of data sectors that may correspond to an erase unit of the flash memory unit.

If a previous version of the RMT portion exists (150) which may have preceded the current RMT portion, where the current RMT portion refers to the portion written to in (146), then the pointer management operations (ISO) may write a pointer to point to the location of the previous RMT portion to the same portion of the RMT written to in (154). According to some embodiments of the invention, the pointer may contain the location information of the preceding RMT portion. Otherwise, if the preceding version of the RMT portion does not exist then the method may proceed to step 160.

A pointer may be written to the MDB (160). The pointer may contain location information of the RMT portion (146). In addition a pointer may be written to the RMT portion to point to the latest version of the MDB (164). The latest version of the MDB may be the MDB after the write of a pointer to the MDB to point to the location of the RMT portion. If not all of the requested pointers have been written (170, whether the pointers are being created or edited, the process may return to writing a pointer to the RMT with the location of a data element (146), where the data element May be the next element requiring a pointer write in the data management structure.

Referring back to FIG. 2A, method 100 may also include stages 120 and 121.

If a predetermined condition is reached (120), then data sectors may be merged (121) into erase unit sized sections. A section may refer to a combination of a plurality of data sectors whose total data size may be not greater than the size of a single erase unit of the nonvolatile memory of a flash memory device. The data sectors which may be merged may be mapped to the same flash memory block. According to one embodiment of the invention once a predefined number of sectors that belong to the same flash memory block are written a predetermined condition may be reached, which may cause a merge of the data sectors to occur.

The merging (121) can include merging data sectors stored in the data buffer with data sectors that are already stored in a sequential nonvolatile portion of the flash memory device, thereby emptying the data buffer and filling the sequential nonvolatile portion, wherein the sequential nonvolatile portion differs from the data buffer. The merging can be executed in iterations wherein each iteration involves merging data sectors that should be written to the same erase unit.

The data sections may then be written to available erase units in the nonvolatile memory module of a flash memory unit. In some embodiments of the invention, the data may be written to a memory module associated with the data type within the nonvolatile memory. According to one embodiment of the invention, data sections may be written to one module, such as the random access portion and then the writing operation may be redirected to write to the sequential access portion if data is detected that is associated with sequential access memory.

Stage 121 may include:
i. Stage 124 of merging data sectors by writing them to the volatile merger portion 233.
ii. Stage 130 of writing data sectors that were merged into erase units of the nonvolatile sequential portion of the nonvolatile memory module.
iii. Stage 136 of editing or creating pointers to locations of the data sectors at the nonvolatile sequential portion after the merger.

According to some embodiments of the invention, the pointers associated with the data sectors may be edited (136) to point to the new location of the data sections. Editing the pointers (136) may be accomplished through processes (180). According to an embodiment of the invention, editing pointers may refer to associating to the corresponding pointers located in the data management structure, new locations in the nonvolatile memory corresponding to data sectors that may have been merged (124) and written (130).

Figure 3:
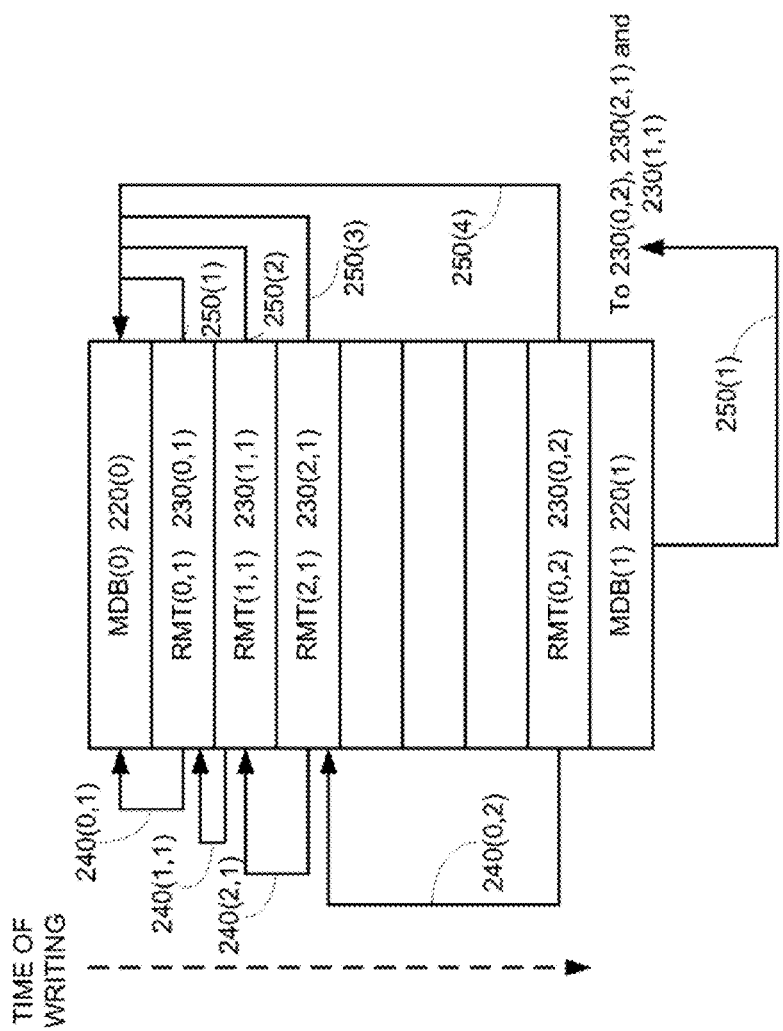
FIG. 3 illustrates a metadata buffer according to an embodiment of the invention.

FIG. 3 illustrates a metadata buffer 200 according to an embodiment of the invention. The metadata buffer 200 may include various portions of the RMT and the MDB and may also store additional information or metadata.

FIG. 3 illustrates a first MDB denoted MDB0 220(0), where 220(x) may refer to the MDB versions over time of writing. MDB0 may store pointers (not shown) to previous versions of the RMT (not shown) that may have been written to the metadata buffer before MDB0 was written. According to one embodiment of the invention, MDB0 may refer to a version of the MDB out of a plurality of MDB version created over a time period, which may be preceded by a MDB version and may be succeeded by MDB1 and so on.

The first MDB 220(0) may be followed by portions of the RMT. According to one embodiment of the invention. the RMT portions may include two versions of the first portion of the RMT. RMT(0,1) 230(0,1) and RMT0,2 230(0,2), wherein the latter RMT(0,2) 230(0,2) is the most updated version and is used to read back the most recent pointers to data elements associated with RMT portion (0,x) 230(0,x).

According to some embodiments of the invention RMT (0, 1) 230(0, 1) is the previous version of the RMT portion and may be used for archival, recovery and error management purposes.

According to some embodiments of the invention, the first MDB 2200 may also be followed by the most updated versions of other portions of the RMT which may be identified as RMT (1, 1) 230(1, 1) and RMT ((2, 1)) 230((2, 1)). Where both RMT(1,1) 230(1,1) and RMT((2,1)) 230((2, 1)) may refer to portions of the RMT in their a previous version as compared to for example RMT(1,2) 230(1,2).

According to some embodiments of the invention, all RMT portions that follow MDB0 2200 may include pointers 250(1)-250(4) to MDB0. According to one embodiment of the invention pointers 250(1)-250(4) may be referred to as pointers in written to each RMT portion pointing to the most recent version of the MDB.

According to some embodiments of the invention, each RMT portion may include a pointer to the last RMT portion that may have preceded it, as illustrated by pointers 240((0,2), 2400(2, 1)), 240((1, 1) and 240((0, 1), where each RMT portion contains a pointer pointing to the preceding RMT portion. In one embodiment of the invention, the RMT portions point to the preceding RMT portion regardless of the type or amount of data between such two RMT portions.

According to some embodiments of the invention. MDB1 220(1) may refer to the succeeding version of the MDB0 220(0) and before the creation of MDB2 not shown. MDB1 may be referred to as the most recent MDB version.

In some embodiments of the invention, MDB1 220(1) may include pointers 250(1) to all the most updated versions of the RMT-RMT(0,2) 230(0,2), RMT(1,1) 230(1,1) and RMT((2, 1)) 230((2,1)). In one embodiment of the invention, all the most recent RMT portions may refer to the latest version of each RMT portions 230(0,x)-230(2,x) located before MDB1 220(1). Located before may refer to an earlier location in the stack with regard to time of writing.

According to one embodiment of the invention, if some or all of the most recent portions of the RMT may be located before MDB0, then even MDB1 may have, pointers to such RMT portions included in the pointers 250(1).

According to some embodiments of the invention, the RMT and MDB located in the metadata buffer in the nonvolatile memory may enable a reconstruction of the RMT and MDB in the event that a power failure condition may occur. In case of power failure, there may be MDB in the volatile memory that will be lost. That MDB was most updated, far more updated than the one saved in nonvolatile memory. That MDB can be recovered from latest RMTs saved in nonvolatile memory and last, but not most updated version of MDB in nonvolatile.

If a power failure condition may have occurred the metadata buffer 200 may be scanned, starting from the latest portions, with regard to time of writing, in order to find the most updated version of the MDB.

According to one embodiment of the invention, if the most recent data structure found in the metadata buffer 200 is a RMT, while the MDB stored is out of date, then it may be assumed that the MDB may be reconstructed based on pointers contained within the RMT. The MDB being out of date may refer to a condition when the MDB does not contain all of the pointers to the most recent RMT portions contained in the metadata buffer 200. In one embodiment of the invention the MDB may be reconstructed by first locating all of the most recent portions of the RMT contained in a metadata buffer 200. Then the MDB may be constructed by writing pointers to the MDB for each of the most recent RMT portions located.

According to one embodiment of the invention, if a RMT portion is found before the most updated MDB then the pointer, which may be included in that RMT portion, may be used to locate the most recent version of the MDB. Then a range of addresses following the located MDB may be scanned through to the most recent RMT portions that were written to the metadata buffer 200 after the MDB and are not reference by the pointers to RMT portions contained within the located version of the MDB.

According to an embodiment of the invention, if a power failure occurred after RMT 1 was successfully written to metadata buffer 200, then the pointers contained within RMT 1 may assist in reconstructing the MDB.

According to an embodiment of the invention, if a power failure occurred after RMT(0,2) 230(0,2) was written to the metadata stack 200 and before MDB1 was written, then the pointer 250(4) may be used to retrieve MDB0 and pointers 240((0,2), 240(((2,1)), 240((1,1) and 240((0,1) which point to the preceding RMT portions respective of each of portions RMT(0,2) 230(0,2), RMT((2, 1)) 230((2,1)), RMT(1,1) 230(1,1), RMT(0,1) 230(0,1). These pointer may be then used to fetch the RMT portions that followed MDB0.

Figure 4:
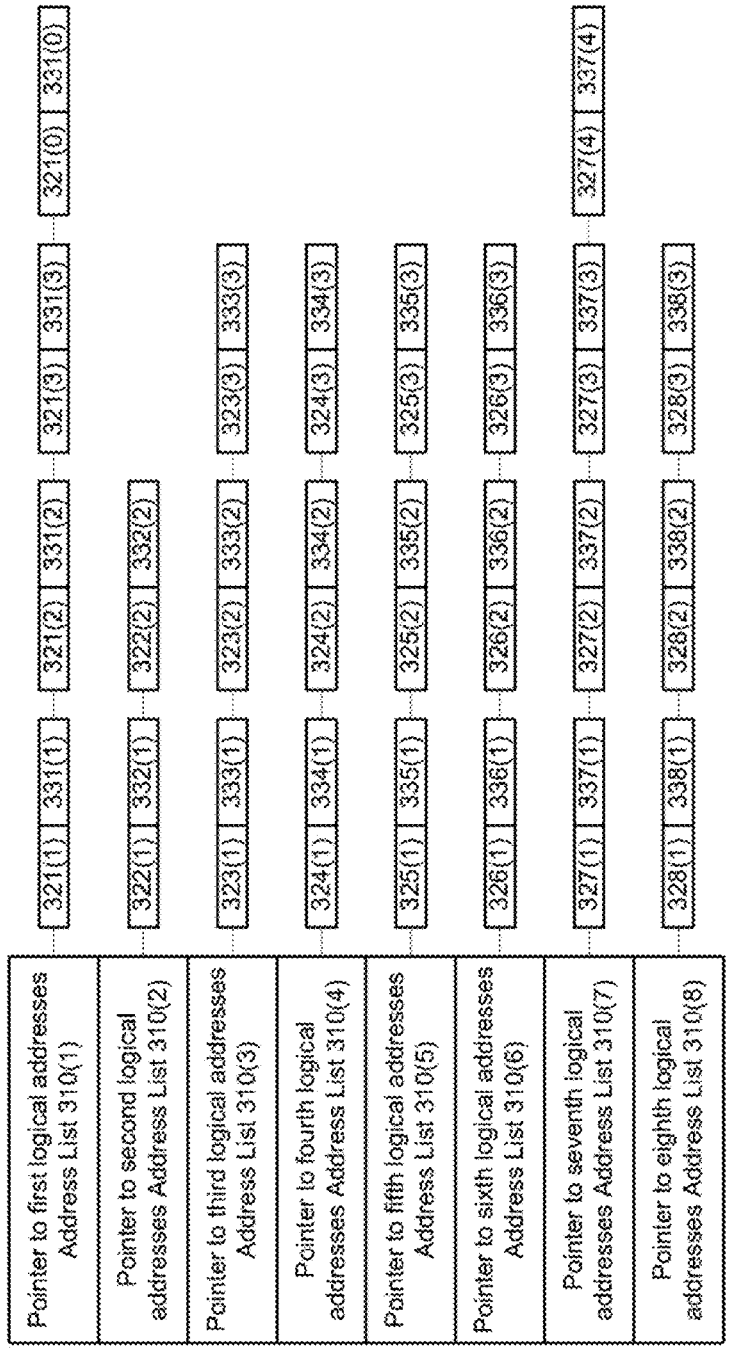
FIG. 4 illustrates address lists that are contained in a random mapping table according to an embodiment of the invention.
Figure 5A:
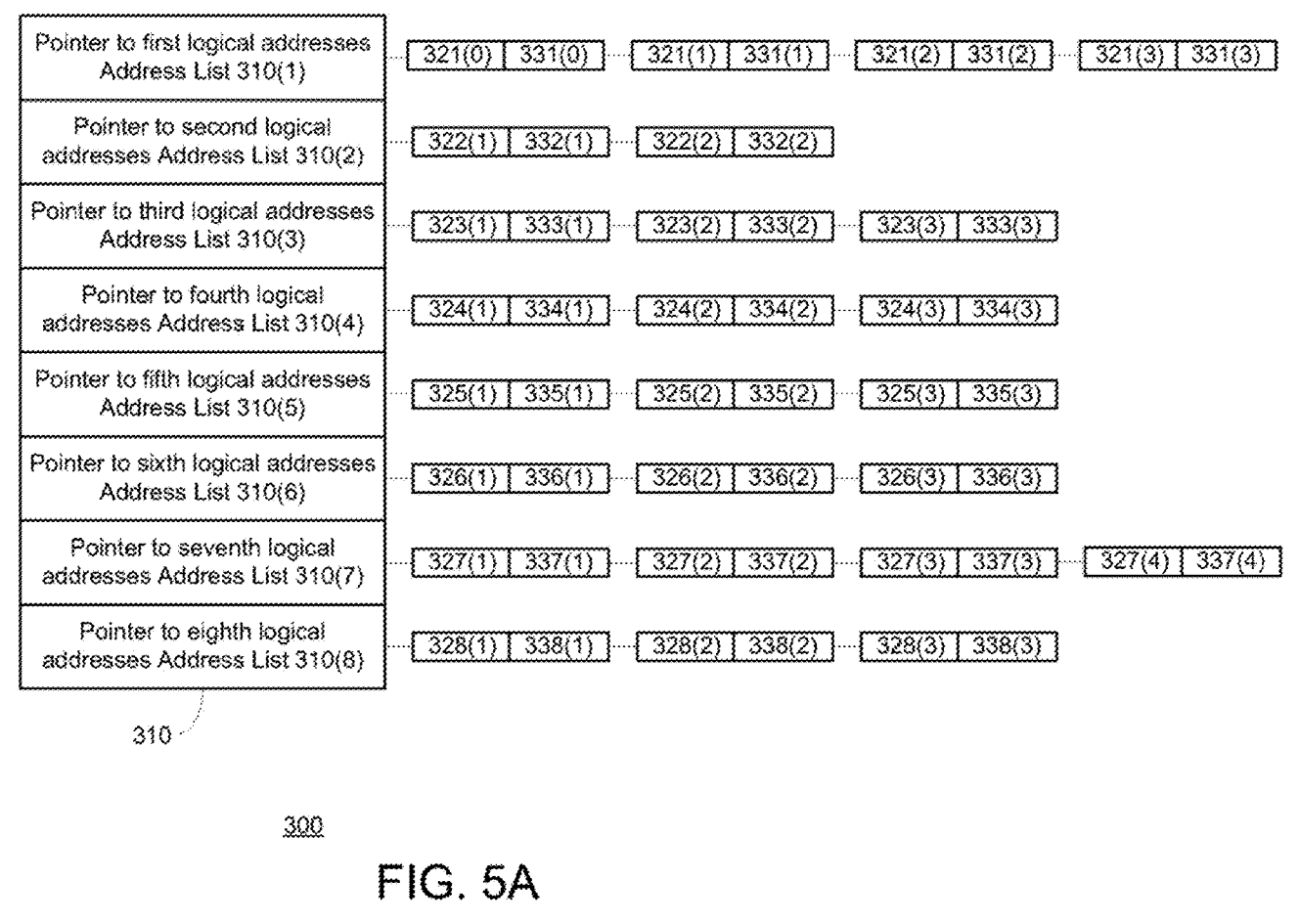

FIG. 4 and FIG. 5A illustrate address lists which may be included in the RMT, according to an embodiment of the invention. According to an embodiment of the invention, the address lists may be contained in one or both of the RMT in the nonvolatile memory module and in the RMT in the volatile memory module.

According to an embodiment of the invention, the address list may be stored in the RMT volatile memory module 80, while a compressed format of it may be stored in the RMT contained in the nonvolatile flash memory module 60. According to another embodiment of the invention, the RMT in the volatile memory only contains the most recent or a plurality of the most recent versions of the address list.

FIG. 4 illustrates eight address list contained within an RMT 310. According to some embodiment of the invention, a set plurality of address lists may be provided. According to an embodiment of the invention, the number of address lists provided in an RMT may indicate the possible values which may be used as possible outcomes of the hash function. In some embodiments of the invention, various hash functions which may be disclosed herein may be applied to the logical addresses of a data element for which pointers are being created. The hash function selected may determine a hash value. The hash value may be associated to one of a plurality of address lists.

The number of pairs of pointers per each address list may change according to the implementation. Though the illustrations of FIG. 4 and FIG. 5A. only list a maximum of four elements in each address list, according to embodiments of the invention various address list lengths may be implemented.

According to an embodiment of the invention the RMT contains within it eight pointers which each point to a separate address list. Such pointers 310(1)-310(8) may point to a pair of pointers ((321(1), 331(1))-((328(1), 338(1))), respectively. The pointers of the address list each may point to other related pointers of the same address list such as pointers 331(1)-338(1) may point to a pair of pointers ((321(2), 331(2)))-((328(2), 338(2))), respectively. Pointers 331(2) and 333(2)-338(2) may point to a pair of pointers ((321(3), 331(3))) and (323(3), 333(3)))-((328(3), 338(3))), respectively. Pointers 331(3) and 337(3) may point to a pair of pointers ((321(0), 331(0))) and (327(4), 337(4))), respectively.

Figure 5B:
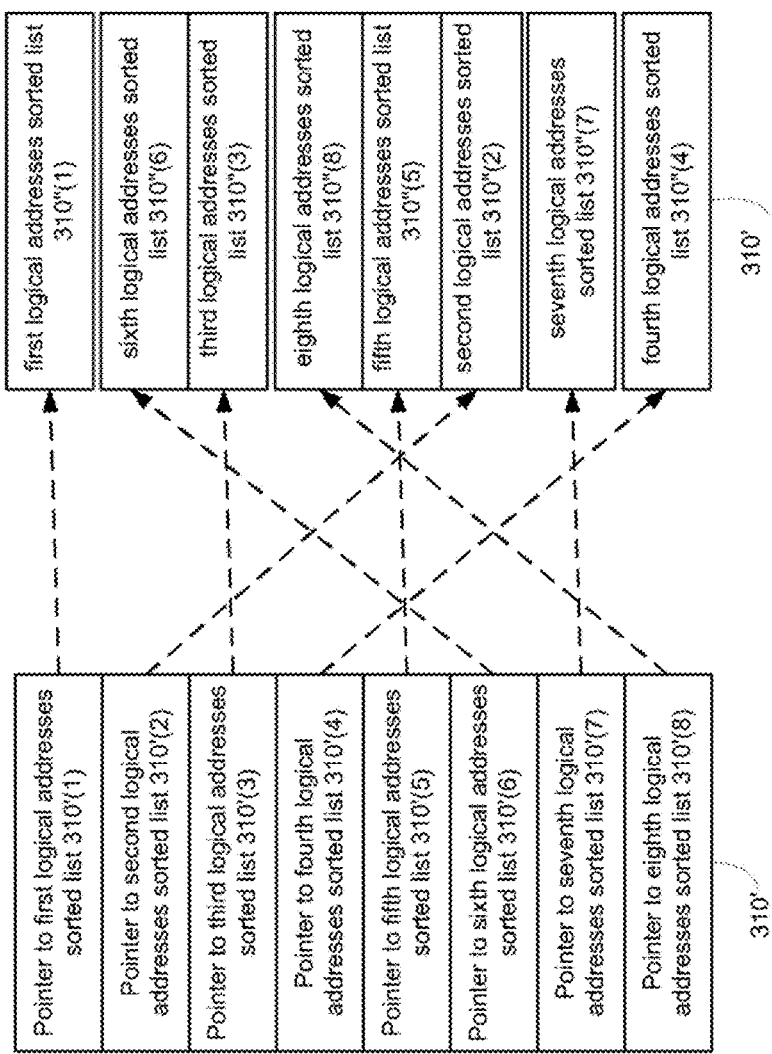
FIG. 5 illustrates address lists that are contained in a random mapping table according to an embodiment of the invention.

FIG. 5B illustrated sorted lists of pointers 310" and pointers 310' to the sorted lists of pointers according to an embodiment of the invention.

Each sorted address list of pointers includes pointers to addresses of data sectors stored in the nonvolatile data buffer 210.

FIG. 4 illustrates address lists according to an embodiment of the invention that are ordered, except the first address list. According to one embodiment of the invention, the first address list may include a pair of pointers (321(0), 331(0))) that were added to the address list after the latest periodic sort of the address list. Sorting of the address list may be accomplished through various sorting methods, including those previously described in this specification. Sorting of the list may occur at periodic intervals or may be triggered by a preset condition. After a sort has been performed on the address list 310(1), the first address list may appear as illustrated in FIG. 5. According to some embodiments of the invention, sorting the address list may refer to arranging the pointers in a predefined order based on the pointer numbers of the pointers of that address list.

According to one embodiment of the invention, a time gap may be implemented between the addition of new pointers and the initializing of the sorting process. This may allow for and additional evaluating process, which may be used to, determine which sectors may have been recently written and how the address list was modified.

Figure 6:
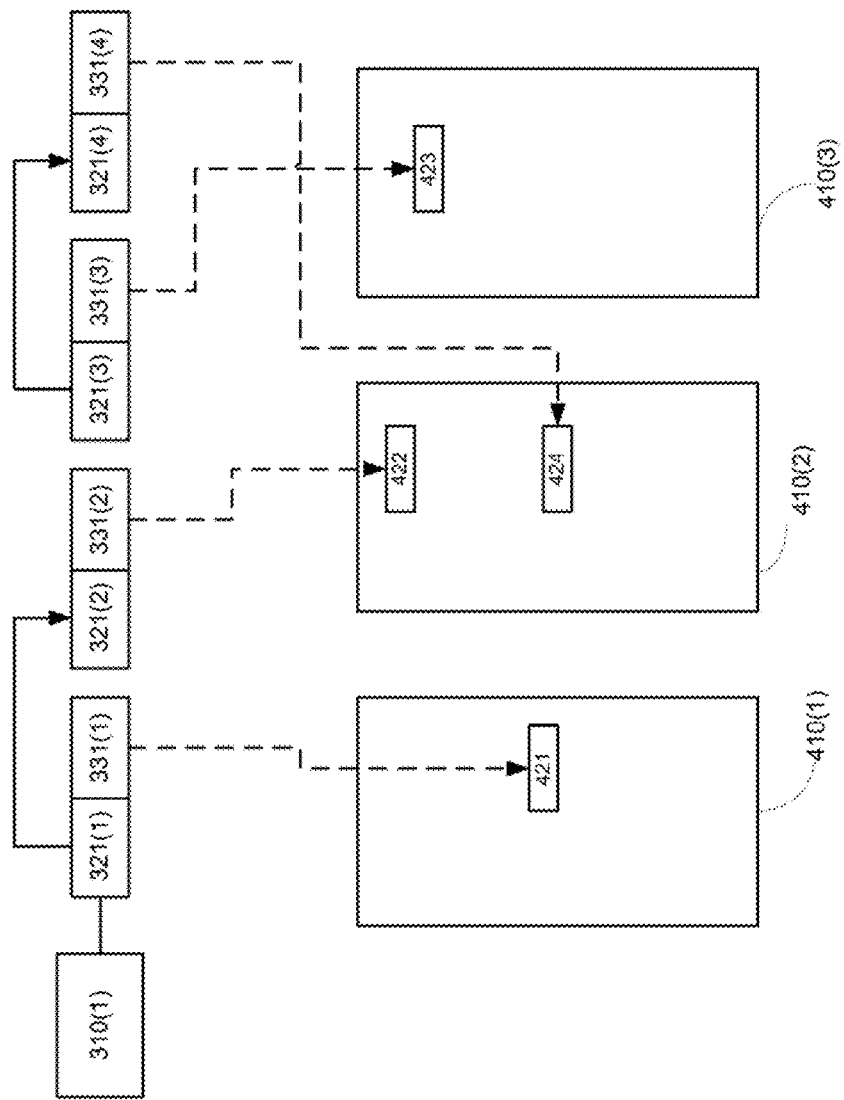
FIG. 6 illustrates a portion of a first address list and sectors stored in blocks of the random portion according to an embodiment of the invention.

FIG. 6 illustrates, according to an embodiment of the invention, a portion of a first address list pointed to by pointer 310(1), and containing pointers 321(1)-321(4), 331(1)-331(4) and sectors stored in blocks 410(1)-410(3) of the random portion.

FIG. 6 illustrates sectors 421-424 that may be pointed by pointers 331(1)-331(4) of the first address list of FIG. 4 and FIG. 5. According to some embodiments of the invention, FIG. 6 illustrates that adjacent elements of the address list may point to non-continuous element with regard to their location in the nonvolatile memory and the address list may point to elements which may be stored in different erase units of the nonvolatile memory of the flash memory unit. According to one embodiment of the invention, the address list pointer may point to pointer 321(1), which contains 331(1) pointing to data element 421 located in erase unit 410(1). Pointer 321(1) further may point to pointer 321(2), which may contain pointer 331(2) to data element 422 located in erase unit 410(2). Though the address elements are linked and are in order, the data elements may be out of order and may be located in separate erase units of the nonvolatile memory.

Figure 7:
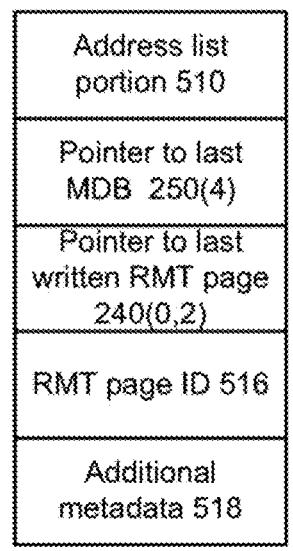
FIG. 7 illustrates a portion of a random mapping table according to an embodiment of the invention.

FIG. 7 illustrates a portion of a RMT structure, 230(0,3), according to an embodiment of the invention. According to an embodiment of the invention, portion 230(0,3) may include a portion of the address list (510), a pointer 250(4) to the last MDB that preceded the RMT portion which may be MDB(0), a pointer 240(0,2) to the last RMT portion that preceded RMT portion 230(0,3). RMT page ID (516), additional metadata (518).

The portion of the address list (510) may contain pointers that were written to the RMT portion corresponding to a data element.

According to an embodiment of the invention, the RMT page ID (516) may be used as an identifier of the page of the RMT, where the RMT may be stored on a plurality of pages. According to an embodiment of the invention, the RMT portions 230(0,1) and 230(0,2) may have the same RMT page ID.

According to an embodiment of the invention, additional metadata (518) may be contained in the RMT portion and may provide information including information about irrelevant portions of date that was merged or overwritten in sequential portion memory.

Figure 8:
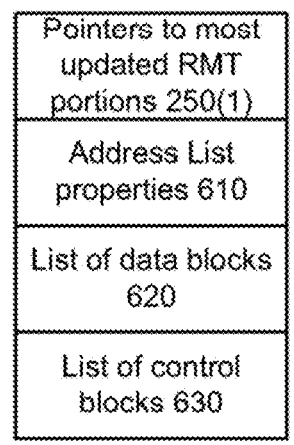
FIG. 8 illustrates a metadata data structure according to an embodiment of the invention.

FIG. 8 illustrates an MDB 220(1), according to an embodiment of the invention. MDB(1) 220(1) may include, pointers to most recent RMT portions 250(1), address lists properties (610), a list of data blocks (620) that may be stored at the random portion of the nonvolatile memory and a list of control blocks (630) that is also referred to as a metadata buffer.

According to an embodiment of the invention, the address lists properties (610) may include such information as actual length of each address list contained in the RMT and a maximal allowable length of each address list of the RMT.

According to an embodiment of the invention, the list of data blocks (620) may refer to a list erase units which may be managed by this data management structure including the RMT and MDB and may be the random whole or part of the random access module of the nonvolatile memory.

According to an embodiment of the invention, the list of control blocks (630) may include a list of data blocks which may be managed by this management data structure and may be dedicated for control and management data including the RMT and the MDB.

Figure 9:
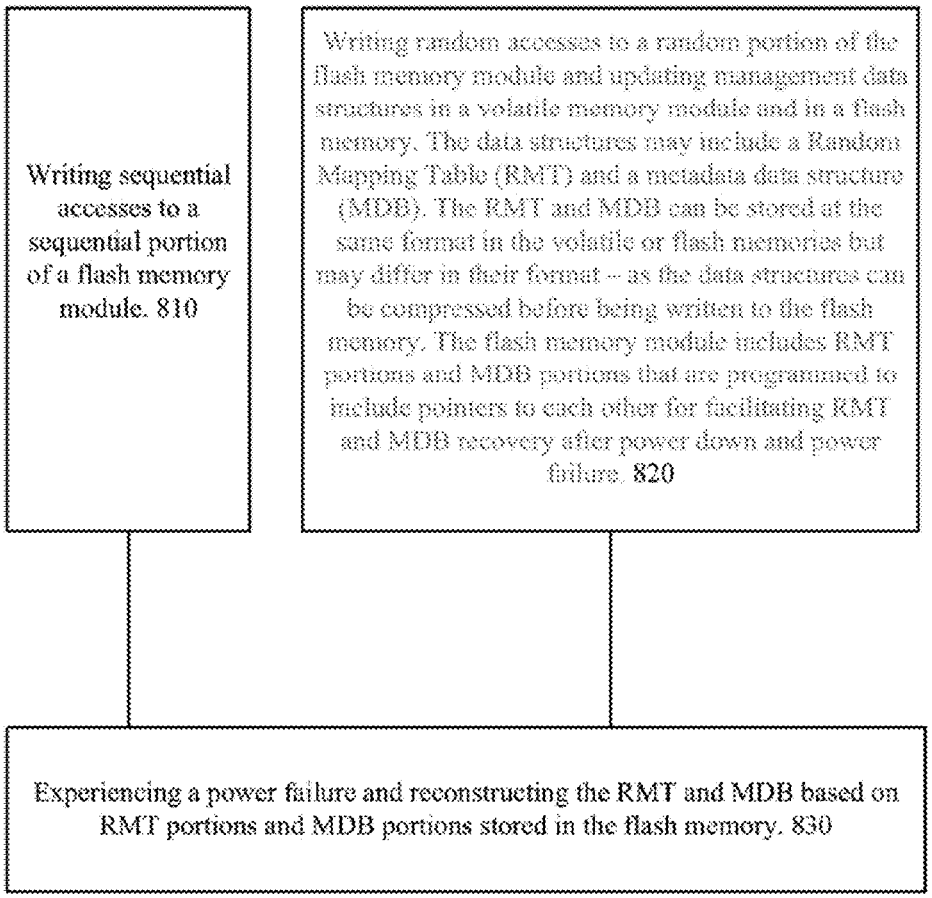
FIG. 9 is a method for managing a flash memory unit according to an embodiment of the invention.

FIG. 9 illustrates a method 800 for managing a flash memory unit, according to an embodiment of the invention. Method 800 may begin with one or both of stages 810 and 820. According to one embodiment of the invention, stage 810 may include, writing sequential accesses to a sequential portion of a flash memory module. Stage 820 may include writing random accesses to a random portion of the flash memory module and updating data management structure in a volatile memory module and in a flash memory. The data structures may include a random mapping table (RMT) and a metadata data structure (MDB). The RMT and MDB may be stored in the same format in the volatile or flash memories, but may differ in their content.

According to one embodiment of the invention, the data structures may be compressed before being written to the flash memory module. According to some embodiment of the invention, the flash memory module may include RMT portions and MDB portions that may be programmed to include pointers to each other for facilitating RMT and MDB recovery after power failure.

According to some embodiment of the invention, stages 810 and 820 may be followed by stage 830 of experiencing a power failure and reconstructing the RMT and MDB based on RMT portions and MDB portions stored in the flash memory.

According to one embodiment of the invention, the method 800 may include determining whether the writing is sequential or random and may further include storing sectors in the random portion until it may be determined that the writing is sequential.

According to an embodiment of the invention, the method 800 may be executed by a computer that executes instructions stored in a non-transitory computer readable medium of a computer program product.

Figure 10:
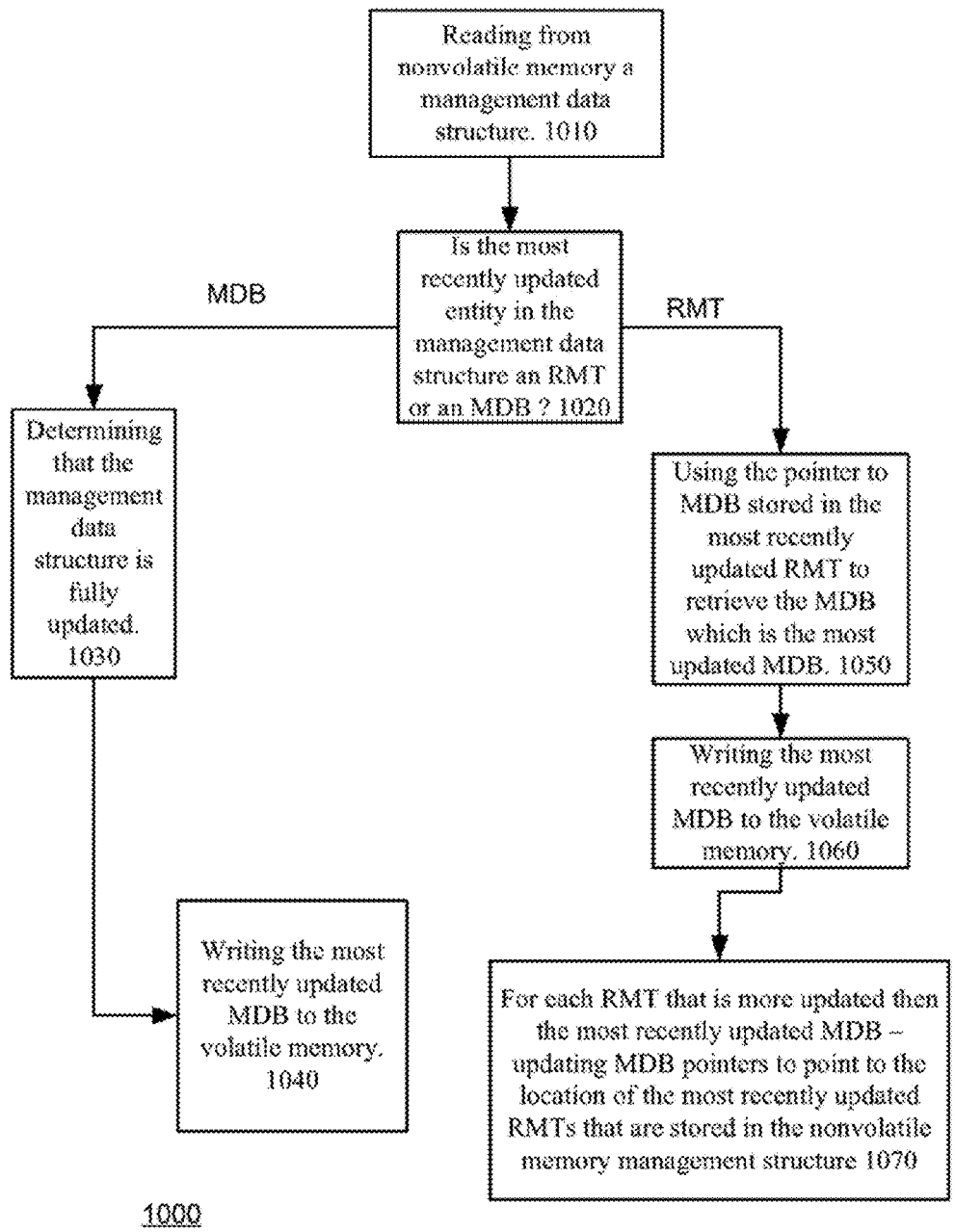
FIG. 10 is a schematic flow chart diagram of a method according to an embodiment of the invention.

FIG. 10 is a schematic flow chart diagram of a method 1000, according to an embodiment of the invention. In case of a power failure condition, the volatile memory module of the flash memory unit may become unusable to read the most recently updated RMT and the most recently updated MDB structures.

A power failure condition may refer to any condition where the power supply changed for any period of time outside of operational levels or any other condition which may affect the integrity of the data contained in the volatile memory module of the flash memory unit. In such a case, method 1000 may be used to restore the most recently updated available contents of the RMT and MDB that may have been in the volatile memory before the power failure condition.

According to some embodiments of the invention, the contents of the nonvolatile memory data management structure are first read (1010). According to one embodiment of the invention, these contents may be compressed, in that case the reading step 1010, may involve uncompressing the data management structure so that it the data contained within may be accessed.

The data management structure may then be searched in order to determine whether the most recently updated entity in the data management structure is an MDB or an RMT (1020).

If it is determined that the most recent (the most recently updated) entity it an RMT then stage 1020 is followed by: (A) stage 1050 of using the pointer in the most recently updated RMT to retrieve the MDB pointed by that pointer (this MDB is the most recently updated MDB), (B) stage 1060 of writing the most recently updated MDB to a non-volatile memory and (C) stage 1070 of updating, each RMT that is more recently updated then the most recently updated MDB, by updating their MDB pointers to point to the location of the most recently updated MDB that is being stored in the volatile memory.

If it is determined that the most recent (the most recently updated) entity it an MBD then stage 1020 is followed by: (A) stage 1030 of determining that the of management date structure is fully updated, and (B) stage 1040 of writing the most recently updated MDB to a non-volatile memory.

According to some embodiments of the invention, the method then may instruct to read from the most recent MDB that was read in prior steps the pointers to the most recent RMT portions (1080).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:
1. A method of managing a flash memory device, the method comprises:
receiving multiple data sectors from an interface;
writing the multiple data sectors into a data buffer that is nonvolatile;

creating a pointer in a data management structure that is stored in a metadata buffer that is nonvolatile, for each data sector corresponding to a storage location of the data sector in the data buffer;

wherein the data management structure comprises a random mapping table and a metadata data structure;

wherein the random mapping table is partitioned to random mapping table mapping portions;

wherein each random mapping table portion comprises pointers to data sectors stored in the data buffer and a pointer to a previously written metadata data structure;

wherein the metadata data structure comprises pointers to multiple random mapping table portions; and a list of data blocks that are managed by the data management structure;

if a predefined condition is reached, merging data sectors stored in the data buffer with data sectors that are already stored in a sequential nonvolatile portion of the flash memory device, wherein the sequential nonvolatile portion differs from the data buffer and wherein the metadata buffer differs from the data buffer.

2. The method of claim 1, wherein the predetermined condition is reached if a predefined number of new data sectors that should belong to a same erase unit are written.

3. The method of claim 1, comprising merging (a) at least one data sector stored in the data buffer with (b) at least one data sector that is already stored in the sequential nonvolatile portion of the flash memory device and is associated with a same erase unit as the at least one data sector stored in the data buffer.

4. The method according to claim 3, wherein the merging comprises generating a pointer for each erase unit of the sequential nonvolatile portion of the flash memory device.

5. The method of claim 1, comprising writing the multiple data sectors into the data buffer if it is estimated that the multiple data sectors are written to the flash memory device in a random manner; and writing the multiple data sectors into the sequential nonvolatile portion of the flash memory device without writing the multiple data sectors to the data buffer if it is estimated that the multiple data sectors are written to the flash memory device in a sequential manner.

6. The method of claim 1, further comprising compressing the data management structure before storing the data management structure in the metadata buffer.

7. The method of claim 1, further comprising maintaining at least a portion of the data management structure in a volatile memory module of the flash memory device and retrieving the data management structure from the metadata buffer if a power failure condition occurs.

8. The method of claim 7, comprising:
searching the data management structure stored in the metadata buffer for a most recent version of the metadata data structure;
reading from the metadata data structure pointers associated with most recent random mapping table portions;
if one of a plurality of the most recent portions of the random mapping table is found before the most recent version of the metadata data structure then reading from the most recent portion of the random mapping table a pointer to a certain metadata data structure;
if the certain metadata data structure is out of date then reconstructing the metadata data structure from the most recent portions of the random mapping table to comprise pointers contained in the random mapping table.

9. The method of claim 1, wherein each random mapping table portion comprises a pointer to a previously written random mapping table portion.

10. A system for managing a flash memory device, the system comprises a memory controller that is arranged to: receive multiple data sectors from an interface; write the multiple data sectors into a data buffer that is nonvolatile; create a pointer in a data management structure that is stored in a metadata buffer that is nonvolatile, for each data sector corresponding to a storage location of the data sector in the data buffer; wherein the data management structure comprises a random mapping table and a metadata data structure; wherein the random mapping table is partitioned to random mapping table mapping portions; wherein each random mapping table portion comprises pointers to data sectors stored in the data buffer and a pointer to a previously written metadata data structure; wherein the metadata data structure comprises pointers to multiple random mapping table portions and a list of data blocks that are managed by the data management structure; if a predetermined condition is reached, merge data sectors stored in the data buffer with data sectors that are already stored in a sequential nonvolatile portion of the flash memory device, wherein the sequential nonvolatile portion differs from the data buffer and wherein the metadata buffer differs from the data buffer.

11. The system of claim 10, wherein the memory controller is arranged to merge (a) at least one data sector stored in the data buffer with (b) at least one data sector that is already stored in the sequential nonvolatile portion of the flash memory device and is associated with a same erase unit as the at least one data sector stored in the data buffer.

12. The system of claim 10, wherein the memory controller is arranged to write the multiple data sectors into the data buffer if it is estimated that the multiple data sectors are written to the flash memory device in a random manner; and write the multiple data sectors into the sequential nonvolatile portion of the flash memory device without writing the multiple data sectors to the data buffer if it is estimated that the multiple data sectors are written to the flash memory device in a sequential manner.

13. The system of claim 10, wherein the memory controller is arranged to maintain at least a portion of the data management structure in a volatile memory module of the flash memory device and retrieve the data management structure from the metadata buffer if a power failure condition occurs.

14. The system of claim 13, wherein the memory controller is arranged to read, if a power failure condition occurs, most recent pointers from the data management structure stored in the metadata by: searching the data management structure stored in the metadata buffer for a most recent version of the metadata data structure; reading from the metadata data structure pointers associated with most recent random mapping table portions; if one of a plurality of the most recent portions of the random mapping table is found before the most recent version of the metadata data structure then reading from the most recent portion of the random mapping table a pointer to a certain metadata data structure; if the certain metadata data structure is out of date then reconstructing the metadata data structure from the most recent portions of the random mapping table to comprise pointers contained in the random mapping table.

15. The system of claim 10, wherein the memory controller is arranged to:
write a first pointer to a first portion of a random mapping table stored in the data management structure, said pointer contains the location of the data sector;
if the first portion of the random mapping table is preceded by another random mapping table portion, then writing a second pointer to the first portion of the random mapping table, said second pointer contains the location of the preceding portion of the random mapping table;

write a third pointer to a metadata data structure stored in the data management structure, said third pointer contains the location of the first portion of the random mapping table; and write a fourth pointer in the first portion of the random mapping table, said fourth pointer contains the location of the latest version of the metadata data structure.

16. The system of claim 10, wherein each random mapping table portion comprises a previously written random mapping table portion.

17. A computer readable medium that is not transitory and stores instructions for:

receiving multiple data sectors from an interface;

writing the multiple data sectors into a data buffer that is nonvolatile;

creating a pointer in a data management structure that is stored in a metadata buffer that is nonvolatile, for each data sector corresponding to a storage location of the data sector in the data buffer;

wherein the data management structure comprises a random mapping table and a metadata data structure;

wherein the random mapping table is partitioned to random mapping table mapping portions;

wherein each random mapping table portion comprises pointers to data sectors stored in the data buffer and a pointer to a previously written metadata data structure;

wherein the metadata data structure comprises pointers to multiple random mapping tale portions and a list of data blocks that are managed by the data management structure;

if a predetermined condition is reached, merging data sectors stored in the data buffer with data sectors that are already stored in a sequential nonvolatile portion of the flash memory device, wherein the sequential nonvolatile portion differs from the data buffer and wherein the metadata buffer differs from the data buffer.

18. The computer readable medium of claim 17, wherein the predetermined condition is reached if the data management structure exceeds a predefined size limit.

19. The computer readable medium of claim 17, storing instructions for merging (a) at least one data sector stored in the data buffer with (b) at least one data sector that is already stored in the sequential nonvolatile portion of the flash memory device and is associated with a same erase unit as the at least one data sector stored in the data buffer.

20. The computer readable medium of claim 17, further storing instructions for compressing the data management structure before storing the data management structure in the metadata buffer.

21. The computer readable medium of claim 17, further storing instructions for maintaining at least a portion of the data management structure in a volatile memory module of the flash memory device and retrieving the data management structure from the metadata buffer if a power failure condition occurs.

22. The computer readable medium of claim 21, storing instructions for:

searching the data management structure stored in the metadata buffer for a most recent version of the metadata data structure; reading from the metadata data structure pointers associated with most recent random mapping table portions; if one of a plurality of the most recent portions of the random mapping table is found before the most recent version of the metadata data structure then reading from the most recent portion of the random mapping table a pointer to a certain metadata data structure; if the certain metadata data structure is out of date then reconstructing the metadata data structure from the most recent portions of the random mapping table to comprise pointers contained in the random mapping table.

23. The computer readable medium of claim 17, storing instructions for writing a first pointer to a first portion of a random mapping table of the data management structure;

if the first portion of the random mapping table is preceded by another portion of the random mapping table, then writing a second pointer to the first portion of the random mapping table, the second pointer points to a location of the other portion of the random mapping table;

writing a third pointer to a metadata data structure stored in the data management structure, the third pointer points to a location of the first portion of the random mapping table; and writing a fourth pointer in the first portion of the random mapping table, the fourth pointer points to a location of a latest version of the metadata data structure.

24. The computer readable medium of claim 17, wherein each random mapping table portion comprises a pointer to a previously written random mapping table portion.

25. The method according to claim 1, wherein the predetermined condition is reached if the data management structure exceeds a predefined size limit.

26. The system according to claim 10, wherein the predetermined condition is reached if the data management structure exceeds a predefined size limit.

* * * * *